(12) United States Patent
Fang et al.

(10) Patent No.: US 12,361,425 B2
(45) Date of Patent: Jul. 15, 2025

(54) SYSTEMS AND METHODS FOR TRAIT-BASED TRANSACTION PROCESSING

(71) Applicant: Stripe, Inc., South San Francisco, CA (US)

(72) Inventors: Fanyun Fang, San Francisco, CA (US); Aakash Sahney, Sherman Oaks, CA (US); Christopher Jeffery Streeter, Ardmore, PA (US); Kevin Chekin Ho, New York, NY (US); David Lakata, Brooklyn, NY (US)

(73) Assignee: STRIPE, INC., South San Francisco, CA (US)

( * ) Notice: Subject to any disclaimer, the term of this patent is extended or adjusted under 35 U.S.C. 154(b) by 56 days.

(21) Appl. No.: 18/072,294

(22) Filed: Nov. 30, 2022

(65) Prior Publication Data

US 2024/0177163 A1    May 30, 2024

(51) Int. Cl.
*G06Q 20/40* (2012.01)
*G06Q 30/06* (2023.01)

(52) U.S. Cl.
CPC ......... *G06Q 20/4016* (2013.01); *G06Q 30/06* (2013.01)

(58) Field of Classification Search
CPC ............................ G06Q 20/4016; G06Q 30/06
See application file for complete search history.

(56) References Cited

U.S. PATENT DOCUMENTS

| 7,529,710 B1 * | 5/2009 | Clower | G06Q 20/10 |
| | | | 705/39 |
| 10,867,291 B1 * | 12/2020 | Yien | G06F 21/305 |
| 2016/0005029 A1 * | 1/2016 | Ivey | G09C 1/00 |
| | | | 705/44 |

(Continued)

OTHER PUBLICATIONS

Olufemi, A. R., Kayode, A. B., & Sunday, A. O. (2014). Building a Secure Environment for Client-Side Ecommerce Payment System Using Encryption System. In Proceedings of the World Congress on Engineering (vol. 1).(https://www.iaeng.org/publication/WCE2014/WCE2014_pp456-460.pdf) (Year: 2014).*

*Primary Examiner* — Asha Puttaiah
(74) *Attorney, Agent, or Firm* — Womble Bond Dickinson (US) LLP

(57) ABSTRACT

A method and apparatus for processing a transaction request associated with a merchant platform system may include: receiving, at a commerce platform system, the transaction request; determining a plurality of account traits associated with the merchant platform system; detecting a first account trait from the plurality of account traits associated with the merchant platform system; in response to determining that the first account trait of the plurality of account traits comprises a first value, processing the transaction request to generate an approval status for the transaction request based on a risk value determined by the commerce platform system with respect to the transaction request; and in response to determining that the first account trait of the plurality of account traits comprises a second value, deferring a determination of the risk value for the transaction request to the merchant platform system.

20 Claims, 14 Drawing Sheets

(56) References Cited

U.S. PATENT DOCUMENTS

| | | | |
|---|---|---|---|
| 2017/0308822 A1* | 10/2017 | Prismon | .................... G06F 8/60 |
| 2021/0042722 A1* | 2/2021 | Wolter | ................. G06Q 20/202 |
| 2023/0111785 A1* | 4/2023 | Joshua | ................... G06Q 40/03 |
| | | | 705/38 |

* cited by examiner

SYSTEMS AND METHODS FOR TRAIT-BASED TRANSACTION PROCESSING

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf may drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants may utilize commerce platform systems to process financial transactions for the products and/or services provided to consumers. This may include the merchant, agent, and other users establishing accounts with the commerce platform system. Once the accounts are established, merchants can run financial transactions using the services of the commerce platform system, merchant agents can accept payments from customers on behalf of the merchant for provided products and/or services, and the commerce platform system can process the payments, performs payouts for services rendered, as well as other financial processing services. This processing of payments by the commerce platform system may include running credit cards, crediting a merchant account for the transaction, crediting the agent responsible for the transaction, debiting a commerce platform system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

To prevent fraudulent transactions, such as when a proffered payment is made with a stolen card number, a card number from an expired card, a spoofed card, etc., the commerce platform system may perform fraud detection for the transactions. Such fraud detection can include attempting to determine, based on parameters associated with a transaction, whether there is a likelihood that the transaction is fraudulent. For example, whether a card number is associated with past fraudulent transactions, whether the transaction amount or purchase location is atypical for the card number, what IP address a remote transaction has originated from, etc. Thus, the fraud detection seeks to determine when one or more factors associated with the transaction indicate fraud, such as by employing machine learning techniques to analyze transaction data.

A merchant platform system may consolidate a number of merchants, offering services to the merchants that may include access to the commerce platform system. The merchant platform system may also offer services that are similar to, or extensions of, services offered by the commerce platform system.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
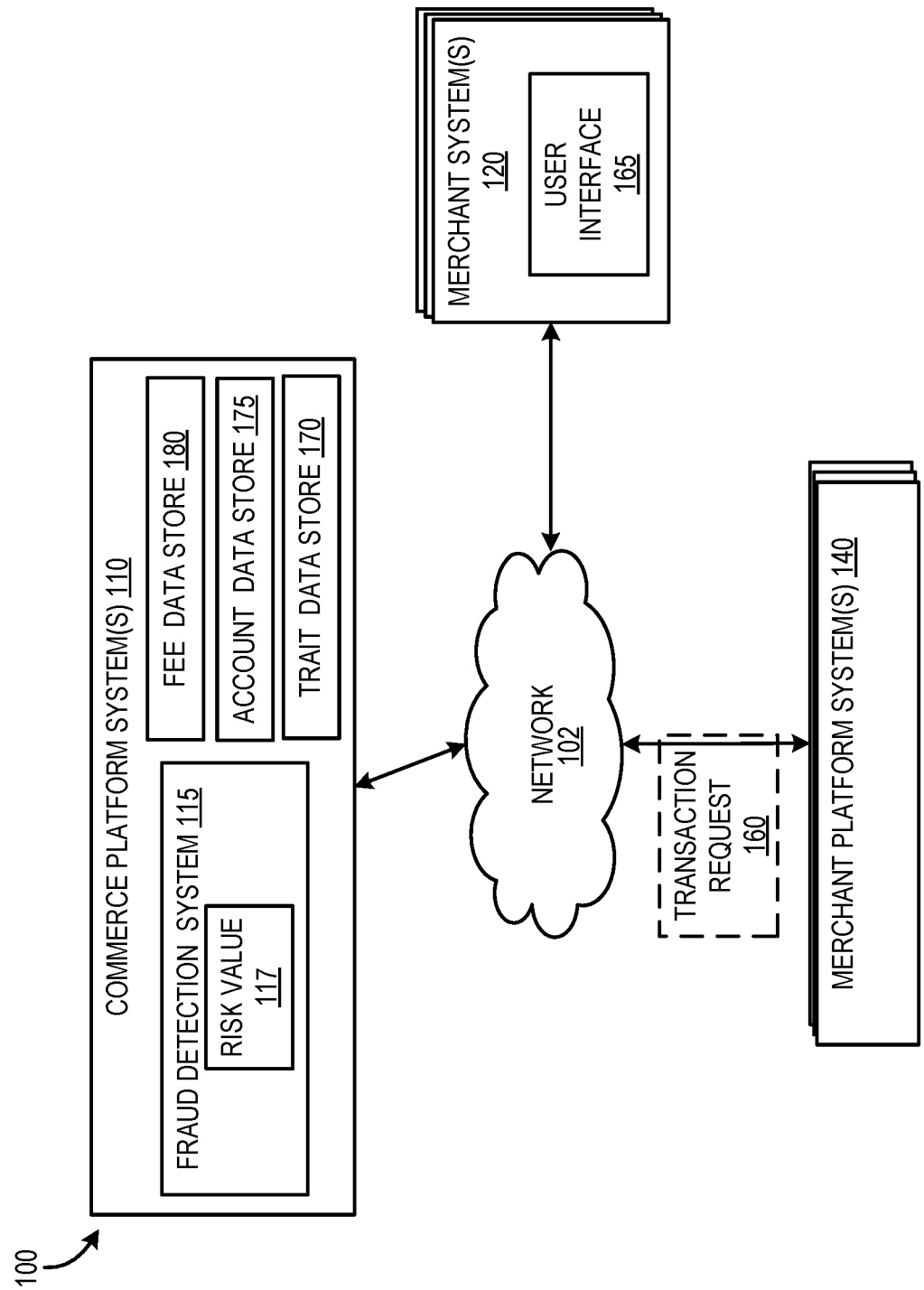
FIG. 1 is a block diagram of an example system architecture incorporating a commerce platform system and a merchant platform system, in accordance with some embodiments of the present disclosure.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory.

These algorithmic descriptions and representations are the means used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "detecting", "determining", "processing", "deferring", "generating", "transmitting", "modifying", "analyzing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Merchants wishing to provide services for their customers may enlist the services of a merchant platform. The merchant platform may consolidate a number of merchants together to provide technical solutions for the merchants that may be specialized and/or customized to the services offered by the merchants. As an example, a merchant with an associated merchant system may be a coffee shop providing coffee to customers, and a merchant platform may consolidate a number of such coffee shops together and offer services that may be advantageous and specialized for coffee shops. As another example, a merchant platform may consolidate a number of independent providers, such as rideshare drivers, providing them interfaces customized to their tasks. The merchant platform may therefore provide interfaces, such as web or mobile interfaces, to allow the individual merchants and/or their merchant systems to track their business (e.g., sales), perform account administration, manage regulations (e.g., taxes and associated reporting), and handle transactions.

In some embodiments, the merchant platform may not perform some or all of the financial processing related services for its merchants, and therefore the merchant platform may utilize the services of a commerce platform. For example, commerce platform services provided by a commerce platform to the merchant platform may include services, such as credit card processing, for the consolidated merchants. In some embodiments, the merchant platform may act as a front end for the merchants with respect to the commerce platform, such that the merchants interact with the merchant platform directly, rather than the commerce platform. This may allow the merchant platform to provide services that augment and/or replace those of the commerce platform.

The use of the merchant platform as an intermediary between the merchant and the commerce platform may complicate the technologies involved. For example, the merchant platform may wish to perform additional and/or different operations than those provided by the commerce platform. For example, the commerce platform may evaluate a transaction request from a merchant to determine a relative risk level of the merchant (e.g., a probability of fraud related to the transaction request). In some embodiments, the merchant platform may wish to control or augment this determination. For example, the merchant platform may have additional information relative to determining the risk associated with the transaction request, and may wish to utilize that information as a replacement for, or in addition to, the risk calculations performed by the commerce platform. As another example, the merchant platform may wish to provide interfaces to the various merchants it serves. However, some of the data that may be provided by way of the interfaces (e.g., information related to card transactions) may be provided by the commerce platform. Thus, the merchant platform may wish to incorporate services provided by a commerce platform, but may wish to have selective control for how those services are presented to its merchants. Such selective control may not be possible with conventional merchant and/or commerce platforms.

Aspects of the present disclosure address the above-noted and other deficiencies by providing embodiments in which traits are provided in the commerce platform (also referred to herein as a commerce platform system) with respect to accounts associated with the merchant platform (also referred to herein as a merchant platform system). The traits may allow selective control of features and/or services provided by the commerce platform with respect to that particular merchant platform and/or merchants associated with the merchant platform. The traits may allow for granular control of the behavior of the commerce platform. Embodiments of the present disclosure may allow for automatic alteration of the behavior of the commerce platform by altering the traits associated with a particular account. Embodiments of the present disclosure may provide a technological improvement to the operation of the commerce platform and/or the merchant platform by allowing operations provided by the commerce platform (and utilized by the merchant platform) to be distinctly separated and selectively executed. Thus, only those operations that are appropriate for a particular merchant and/or merchant platform are executed by the commerce platform, resulting in a reduction in processing operations. The selective execution of the operations (e.g., by a processor of the merchant platform and/or the commerce platform) may allow for a range of functionalities not previously possible. In addition, some embodiments of the present disclosure may allow for the operations performed by the commerce platform and/or the merchant platform to be dynamically adjusted in a way not provided by conventional systems. Some embodiments of the present disclosure may also reduce an execution duplicate and/or unnecessary operations, which may improve a processing speed of the transaction and reduce a number of resources that are used in a commerce platform and/or the merchant platform.

The embodiments discussed herein may be utilized by a plurality of different types of systems, such as other commerce platform system(s) including payment processing systems, card authorization systems, banks, and other systems. Some functionalities of the embodiments described herein relate to seeking to identify and detect fraud associated with transaction requests. Furthermore, any system seeking to identify fraud during an interaction may use and/or extend the techniques discussed herein related to transaction processing. However, to avoid obscuring the embodiments discussed herein, fraud detection utilizing risk identification during commercial transactions is discussed to illustrate and describe some embodiments of the present invention, and is not intended to limit the application of the techniques described herein to other systems in which risk identification in transaction processing could be used.

FIG. 1 is a block diagram of an example system architecture 100 incorporating a commerce platform system 110 and a merchant platform system 140, in accordance with some embodiments of the present disclosure. In some embodiments, the system 100 includes commerce platform system(s) 110, one or more merchant platform system(s) 140, and one or more merchant system(s) 120. In some embodiments, one or more systems (e.g., merchant system 120) may be mobile computing devices, such as a smartphone, tablet computer, smartwatch, etc., as well as computer systems, such as a desktop computer system, laptop computer system, server computer systems, etc. The commerce platform system(s) 110, merchant system(s) 120, and merchant platform system(s) 140 may also be one or more computing devices, such as one or more server computer systems, desktop computer systems, etc.

The commerce platform system(s) 110, merchant system(s) 120, and/or merchant platform system(s) 140 may be coupled to a network 102 and communicate with one another using any of the standard protocols for the exchange of information, including secure communication protocols. In one embodiment, one or more of the commerce platform system(s) 110, merchant system(s) 120, and/or merchant platform system(s) 140 may run on one Local Area Network (LAN) and may be incorporated into the same physical or logical system, or different physical or logical systems. In some embodiments, the commerce platform system(s) 110, merchant system(s) 120, and/or merchant platform system(s) 140 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In some embodiments, the merchant system(s) 120 may include one or more computer systems configured to process transactions associated with a merchant. For example, customers (not shown) may access the merchant system(s) 120, such as by an electronic device over network 102 or in person at an establishment associated with the merchant system(s) 120. The merchant system(s) 120 may offer one or more products and/or services for sale which may be purchased by a customer. For example, a customer may indicate the beginning of a financial transaction with the merchant system(s) 120, such as the use of a credit card to acquire the products and/or services of the merchant system(s) 120. In response to the transaction from the customer, the merchant system(s) 120 may generate a transaction request 160 to the merchant platform system(s) 140. The transaction request 160 may include, for example, information related to the transaction with the customer collected by the merchant system(s) 120 as part of the transaction.

In some embodiments, the merchant platform system(s) 140 may provide one or more services to the merchant system(s) 120. For example, the merchant platform system(s) 140 may provide user interfaces 165 to the merchant system(s) 120, perform account administration, manage regulations (e.g., taxes and associated reporting), and handle transactions. For example, user interface 165 may be presented on the merchant system(s) 120 and provide information to the merchant system(s) 120 (e.g., to a user of the merchant system 120) related to the account corresponding to the merchant system(s) 120 that is maintained at the merchant platform system(s) 140. The user interface 165 may, for example, provide information related to transactions processed for the merchant system(s) 120, charges and/or credits due the merchant system(s) 120, account information related to the merchant system(s) 120, and the like.

For example, in some embodiments, the merchant platform system(s) 140 may be configured to perform transaction processing on the transaction request 160 from the merchant system(s) 120. In some embodiments, the transaction request 160 may be, for example, related to an authentication of a card-based transaction performed at the merchant system(s) 120. For example, the transaction request 160 may be related to a financial transaction received and/or initiated by the merchant system(s) 120 based on a credit card provided to the merchant system(s) 120. As a non-limiting example, the merchant system(s) 120 may process an order or other request from a customer paid for by a credit card that results in the transaction request 160.

In some embodiments, the merchant platform system(s) 140 may receive the transaction request 160 from the merchant system(s) 120 and forward it on to the commerce platform system(s) 110 for processing. In some embodiments, the merchant platform system(s) 140 may process and/or examine the transaction request 160 before providing it to the commerce platform system(s) 110, but the embodiments of the present disclosure are not limited thereto. In some embodiments, the transaction request 160 may be forwarded directly to the commerce platform system(s) 110 by the merchant system(s) 120.

In some embodiments, the commerce platform system(s) 110 may provide financial processing services to one or more merchants, such as to merchant system(s) 120, in response to transaction requests 160. For example, commerce platform system(s) 110 may manage merchant accounts held at the commerce platform system 110, run financial transactions on behalf of a merchant associated with the merchant system(s) 120, clear transactions, perform payouts to merchant and/or merchant agents, manage merchant and/or agent accounts held at the commerce platform system(s) 110, as well as other services typically associated with commerce platforms systems such as, for example, STRIPE™.

In response to the transaction request 160, commerce platform system(s) 110 may perform an authentication operation on the transaction request 160 to prevent and/or reduce fraudulent transactions. In some embodiments, the authentication operation may incorporate a risk calculation performed on the transaction request 160 by a fraud detection system 115 that is associated with the commerce platform system(s) 110. As will be discussed in greater detail herein, the fraud detection system 115 may utilize one or more machine learning models, such as neural network based models, tree based models, support vector machine models, classification based models, regression based models, etc., to analyze attributes associated with a transaction request 160, such as card number used in a transaction, an email address used in the transaction, a dollar amount of a transaction, an IP address of the customer and/or the merchant system(s) 120 making the transaction request, etc., as well as fraud detection features generated by the commerce platform system(s) 110 for use by the machine learning models when analyzing the transaction associated with the transaction request 160, such as a number of transactions on a card used in the transaction, a typical dollar amount of transactions for the card, whether the card number has been used with the email address in a prior transaction, etc.

As part of the authentication operation of the commerce platform system(s) 110, the fraud detection system 115 may generate a risk value 117. The risk value 117 may indicate a relative risk of the transaction associated with the transaction request 160. For example, the risk value 117 may be a numeric value that may vary with the calculated risk of the transaction associated with the transaction request 160. In some embodiments, a higher risk value 117 may indicate a higher level of calculated risk, but the embodiments of the present disclosure are not limited to this configuration. In some embodiments, the risk value 117 may range from 1 to 100, with a risk value 117 of 100 indicating a highest level of risk.

In some embodiments, the commerce platform system(s) 110 may make an authorization and/or authentication decision based on the calculated risk value 117. For example, the commerce platform system(s) 110 may decide to block, perform intervention, or approve the transaction associated with the transaction request 160. Blocking the transaction, which may be because a calculated risk value 117 of the transaction request 160 was too high, may result a message to the merchant system(s) 120 to decline the transaction. In some cases, the commerce platform system(s) 110 may perform intervention related to the transaction request 160 due to the calculated risk value 117. Performing intervention may include, for example, requesting (or asking the merchant system(s) 120 and/or merchant platform system(s) 140 to request) additional information, such as two-factor authentication or other type of activity intended to verify the transaction request 160. The results of the intervention (e.g., successful completion of two-factor authentication) may result in additional processing, such as the approval of the transaction request 160. If the transaction request 160 is approved, the transaction request 160 may be considered to be authenticated.

In some embodiments, the commerce platform system(s) 110 may include an account data store 175, a trait data store 170, and/or a fee data store 180. The account data store 175, the trait data store 170, and/or the fee data store 180 may be a database or other storage of the commerce platform system 110 that stores respective data values. For example, the account data store 175 may provide storage for account data values, the trait data store 170 may provide storage for trait data values, and the fee data store 180 may provide storage for fee data values.

In some embodiments, the commerce platform system(s) 110 may generate the fee data store 180 with respect to the transaction request 160. For example, in some embodiments, the commerce platform system(s) 110 may generate the fee data store 180 that represents a percentage of the value of the transaction request 160. The fee data store 180 may indicate a fee that is due (e.g., a receivable amount) to the commerce platform system(s) 110 as a result of processing the transaction request 160. As a non-limiting example, if the transaction request 160 is associated with a purchase having a particular value (e.g., $100), the fee data store 180 may indicate that a fee of some percentage of the value that is due as a result of processing the transaction request 160.

In some embodiments, the fee data store 180 may indicate a value that is owed by the merchant system(s) 120 that initiated the transaction request 160. However, the embodiments of the present disclosure are not limited to this configuration. In some embodiments, the fee data store 180 may indicate a value that is owed by the merchant platform system(s) 140 as a result of the transaction request 160. That is to say that the fee for processing the transaction request 160 may be associated with the merchant platform system(s) 140 that forwarded the transaction request 160, the merchant system(s) 120 that initiated the transaction request 160, or both.

The account data store 175 may include data values (e.g., data stored within commerce platform system(s) 110) that are associated and/or mapped with accounts associated with the merchant platform system(s) 140 and/or the merchant system(s) 120. For example, each of the merchant platform system(s) 140 of the system architecture 100 may be associated with an account in the account data store 175. The account data store 175 may define information associated with respective ones of the merchant platform system(s) 140 and provide authorization for the merchant platform system(s) 140 to access the commerce platform system(s) 110. In some embodiments, the account data store 175 may also include data associated with each of the merchant system(s) 120, though the embodiments of the present disclosure are not limited thereto. In some embodiments, in order to perform transaction processing on a transaction request 160, the merchant platform system(s) 140 and/or the merchant system(s) 120 that are associated with the transaction request 160 may have a corresponding entry in the account data store 175.

The trait data store 170 may include particular traits, which may also be referred to as characteristics or properties, that are associated with each of the accounts of the account data store 175. For example, trait data store 170 may be present for the merchant platform system(s) 140 and/or the merchant system(s) 120 of the system architecture 100. The trait data store 170 may include data values (e.g., data stored within commerce platform system(s) 110) that are associated and/or mapped with the account data store 175 corresponding to the merchant platform system(s) 140 and/or the merchant system(s) 120. Each of the values of the trait data store 170 may indicate one or more characteristics associated with a given account of the account data store 175.

In some embodiments, the commerce platform system(s) 110 may utilize the trait data store 170 to modify and/or adjust one or more aspects of the transaction processing performed by the commerce platform system(s) 110. For example, when processing a transaction request 160 from a particular merchant platform system 140 as forwarded from a particular merchant system 120, the commerce platform system(s) 110 may adjust the processing of the transaction request 160 based on one or more traits of the trait data store 170 that are associated with accounts of the particular merchant platform system 140 and/or the particular merchant system 120.

As will be described further herein, the trait data store 170 may be utilized to provide granular variations on the transaction processing of the transaction request 160. For example, in some embodiments, the trait data store 170 may indicate how, or whether, the fraud detection system 115 is to generate the risk value 117 associated with the transaction request 160. As another example, in some embodiments, the trait data store 170 may indicate how the fee data store 180 is calculated associated with the transaction request 160. As another example, in some embodiments, the trait data store 170 may indicate how, or whether, the commerce platform system(s) 110 generates a portion of the user interface 165 provided to the merchant system(s) 120. In some embodiments, a particular trait of the trait data store 170 may be associated with a particular role or a particular behavior of the commerce platform system(s) 110, and the particular trait may have different values. The different values of the particular trait may determine different behaviors of the commerce platform system(s) 110 with respect to the particular role and/or behavior represented by the trait. These examples are not intended to limit the embodiments of the present disclosure. One of ordinary skill in the art will recognize that other modifications to the performance of the commerce platform system(s) 110 may be possible based on the trait data store 170 without deviating from the embodiments of the present disclosure.

As described herein, the trait data store 170 may be maintained for each of the accounts of the account data store 175. In other words, each account in the account data store 175 may have a different set of traits associated with the account in the trait data store 170. Thus, different accounts may experience different types of processing from the commerce platform system(s) 110 based on their associated traits. The use of the trait data store 170 allows for granular distinctions to be made in the processing of a transaction request 160 associated with a particular account. This allows the types of operations performed by the commerce platform system(s) 110 for an account to be modified based, at least in part, on the trait data store 170. In addition, the behavior of the commerce platform system(s) 110 for a particular account may be changed (e.g., automatically and without user intervention) merely by changing the trait data store 170 associated with the account. This may reduce an amount of resources that may be needed for customization of the behavior to accommodate the preferences of a particular account holder, rather than the user having to create a new account for each set of characteristics or traits the account is associated with.

The use of the trait data store 170 also allows for the behavior of the commerce platform system(s) 110 to be more transparent. For example, if each of the trait data store 170 is associated with a particular functionality of the commerce platform system(s) 110, a listing of the trait data store 170 for a particular account within the account data store 175 may transparently show how the commerce platform system(s) 110 will behave with respect to that account. This functionality allows for the security of the system architecture 100 to be increased.

Figure 2A:
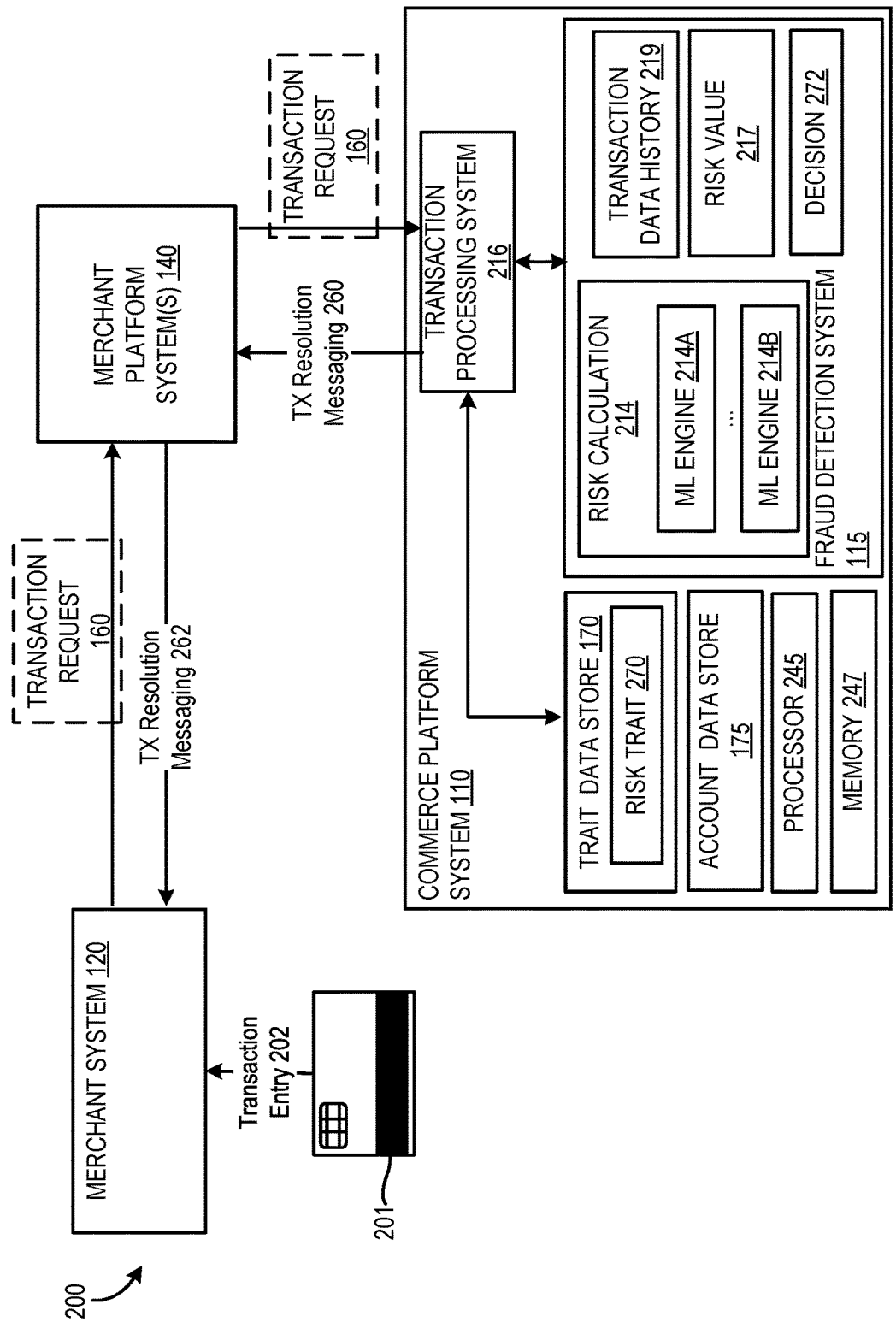
FIG. 2A is a block diagram illustrating the determination of a risk trait having a first risk trait value, in accordance with some embodiments of the present disclosure.
Figure 2B:
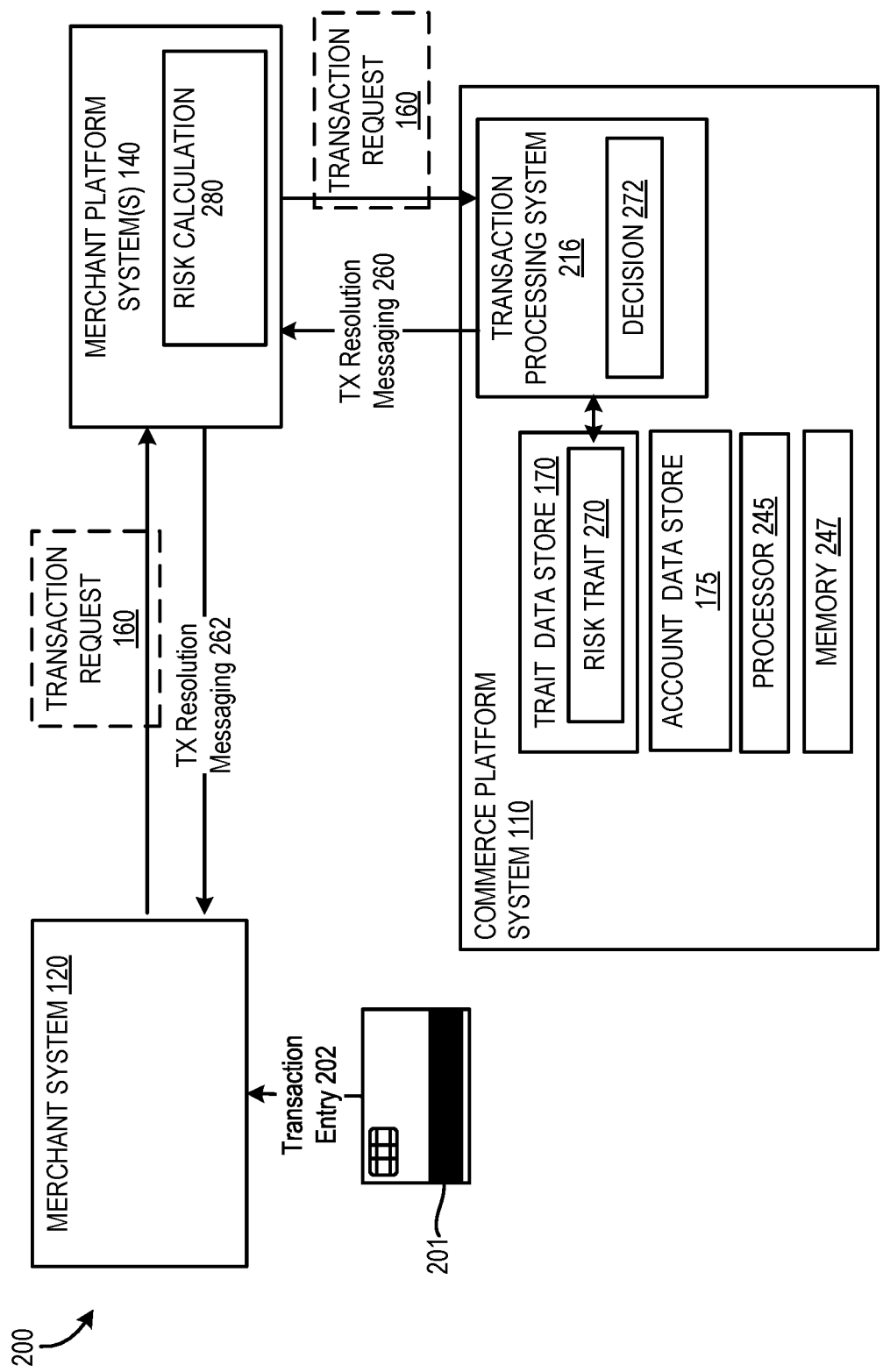
FIG. 2B is a block diagram illustrating the determination of a risk trait having a second risk trait value, in accordance with some embodiments of the present disclosure.
Figure 2C:
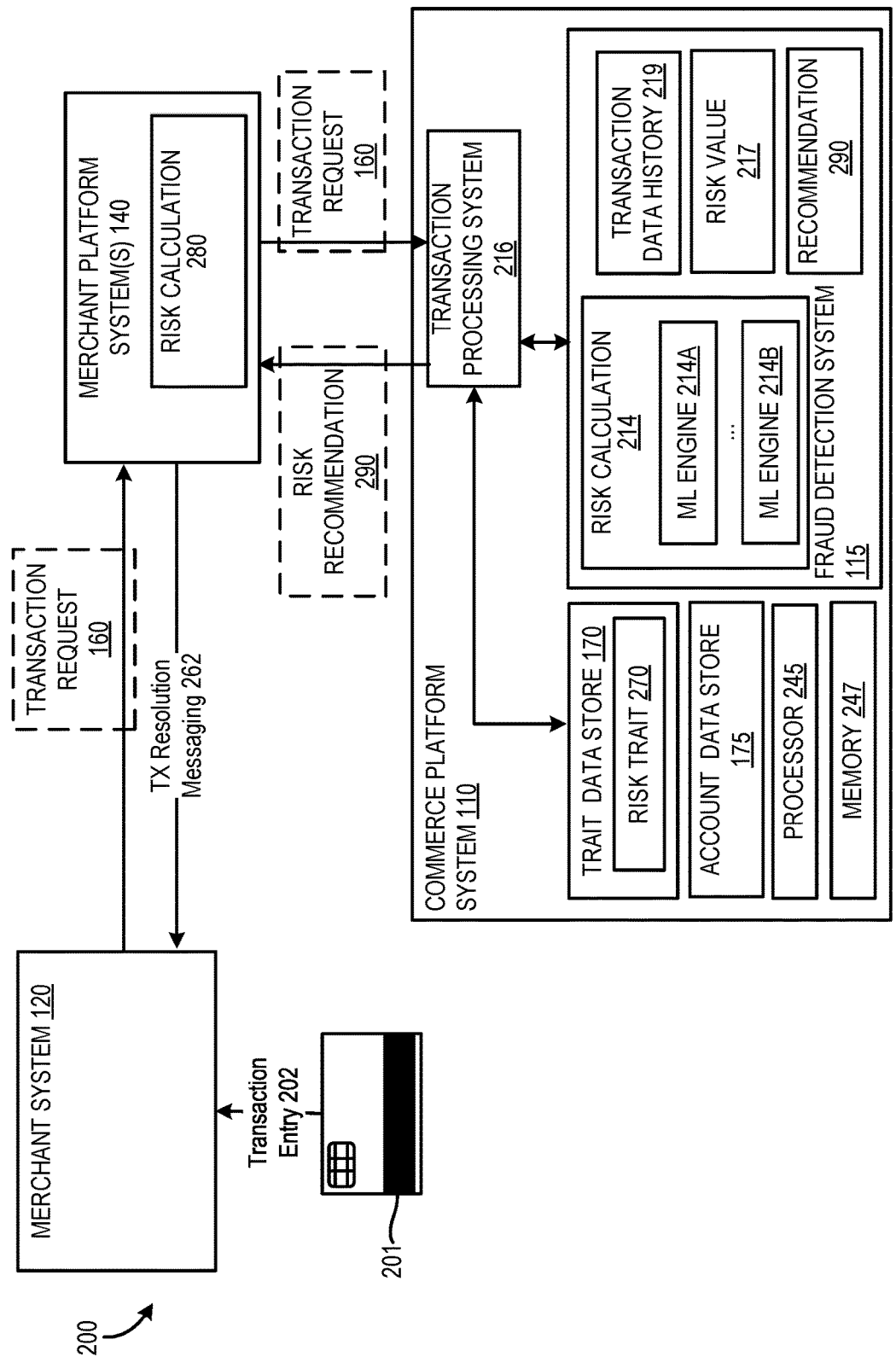
FIG. 2C is a block diagram illustrating the determination of a risk trait having a third risk trait value, in accordance with some embodiments of the present disclosure.

FIGS. 2A, 2B, and 2C are block diagrams of a system 200 utilizing a risk trait 270, in accordance with some embodiments of the present disclosure. FIG. 2A is a block diagram illustrating the determination of the risk trait 270 having a first risk trait value, in accordance with some embodiments of the present disclosure. A description of elements of FIG. 2A that have been previously described herein will be omitted for brevity.

System 200 may include a commerce platform system 110, a merchant platform system 140, and a merchant system 120. The commerce platform system 110, the merchant platform system 140, and the merchant system 120 may be similar to those described herein with respect to FIG. 1.

The commerce platform system 110 may include one or more processors 245 (also referred to herein as processor(s)), memory 247, which may include volatile memory devices (e.g., random access memory (RAM)), non-volatile memory devices (e.g., flash memory) and/or other types of memory devices, and one or more network interfaces. It should be noted that although, for simplicity, a single processor 245 is depicted in the commerce platform system 110 depicted in FIG. 2A, other embodiments of the commerce platform system 110 may include multiple processors, storage devices, or other devices.

Processor 245, which may also be referred to as a processing device, may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 245 may also include one or more special-purpose processing devices such as an application specific integrated circuit (ASIC), a field programmable gate array (FPGA), a digital signal processor (DSP), network processor, or the like.

Though not illustrated expressly with the processor 245 and memory 247, it will be understood that both the merchant system 120 and the merchant platform system 140 may also include a processor and memory in a similar fashion. In some embodiments, the amount and/or type of the memory and/or processor of the merchant system 120 and the merchant platform system 140 may be different from that of the commerce platform system 110.

Referring to FIG. 2A, a merchant system 120 may initiate a transaction, such as for purchase of goods or services offered by the merchant system 120. As part of the transaction, merchant system 120 may collect transaction data entry 202 from a customer of the merchant. For example, the transaction data entry 202 may include at least payment information for use during the transaction. In some embodiments, the transaction data entry 202 may enable the generation of a card not present (CNP) transaction that may enable the merchant system 120 to process the transaction despite not having physical access to a card 201 (e.g., a credit card) to be used for the transaction. The transaction data entry 202 may be transmitted and/or provided to the merchant system 120.

Merchant system 120 may receive the transaction data entry 202, and may generate a transaction request 160 including at least part of the transaction data entry 202 and one or more transaction parameters (e.g., transaction time, amount, type of card used, etc.). The transaction request 160 is then communicated to merchant platform system 140.

As part of the consolidation of the merchant system 120, the merchant platform system 140 may act as intermediary between the merchant system 120 and the commerce platform system 110. The merchant platform system 140 may receive the transaction request 160 and may perform processing operations related to the transaction request 160 on behalf of the merchant system 120. In some embodiments, for example, the merchant platform system 140 may update information associated with the merchant system 120 maintained at the merchant platform system 140 in response to the transaction request 160. In some embodiments, the merchant platform system 140 may then forward the transaction request 160 to the commerce platform system 110.

Commerce platform system 110 may receive the transaction request 160 at transaction processing system 216. In some embodiments, responsive to receiving the transaction request 160, the commerce platform system 110 may analyze the trait data store 170 to determine a value of a risk trait 270 within the trait data store 170. The risk trait 270 may determine how, or if, a risk value 217 is calculated for the transaction request 160 by the commerce platform system 110. A value may be associated with the risk trait 270 for each of the accounts within the account data (see FIG. 1). To determine the value of the risk trait 270, the commerce platform system 110 may determine a value associated with the risk trait 270 of the trait data store 170 for the account associated with the merchant platform system 140 and/or the merchant system 120 that forwarded the transaction request 160. Account information to determine the account associated with the merchant platform system 140 and/or the merchant system 120 may be stored, for example, in account data store 175.

In FIG. 2A, it is assumed that the risk trait 270 associated with the transaction request 160 has a first risk trait value that indicates that the commerce platform system 110 is to calculate a risk value 217 associated with the transaction request 160. The first risk trait value of the risk trait 270 may be a numeric value, a text value, or any other mechanism with respect to the data value that may allow for the differentiation of discrete values of the data value.

In response to determining that the risk trait 270 has the first risk trait value (i.e., indicates that the commerce platform system 110 is to perform the risk calculation), the transaction processing system 216 may provide elements of transaction request 160 to fraud detection system 115. Fraud detection system 115 may utilize a risk calculation engine 214 to generate a risk value 217 that is associated with the transaction request 160 (e.g., as part of an authentication operation of the commerce platform system 110).

In some embodiments, fraud detection system 115 may utilize one or more machine learning (ML) engines 214A, 214B and/or transaction data history 219 to generate the risk value 217 based on the transaction request 160. For example, in some embodiments, ML engines 214A, 214B may be generated (e.g., trained) based on transaction data history 219 containing transaction records associated with prior fraud detection. Though only two ML engines 214A, 214B are illustrated in FIG. 2A, the embodiments of the present disclosure are not limited to this configuration.

In some embodiments, the models used by ML engine(s) 214A and 214B can at least partially be created offline using features extracted from the transaction data history 219, as well as traditional user-based features, and transaction requests 160 associated with prior fraud detection. In embodiments, ML engine(s) 214A and 214B can be trained using training data based on the transaction data history 219, and may further be refined over time based on future transactions for which no fraud was detected and no fraud existed, no fraud was detected but fraud did exist, fraud was detected and no fraud existed, fraud was detected and fraud did exist. In some embodiments, such training data may be gathered from the transaction data history 219. In some embodiments, one or more ML training techniques appropriate for a given model may be executed by ML engine(s) 214A and 214B periodically as new/additional training data becomes available, as well as in real-time using, for example, session data and transaction data as transactions occur.

The specific models used for a predicting the likelihood of fraud using the transaction request 160 may vary based on factors such as whether a user associated with the transaction request 160 has been uniquely identified (e.g., using identifying detail like customer email, phone number, user id (UID)), the extent to which information about the user can be automatically collected (e.g., using cookies, client-side libraries), the extent to which the user has a transaction history, and other factors. Models can be constructed for varying levels of specificity, including at the individual user/identity level, cohort level in which users sharing similar characteristics are grouped, merchant level, and merchant cohort level in which users sharing similar characteristics are grouped. Each of these models can be created using multiple features, including features drawn from the transaction request 160.

Though the use of ML engines 214A, 214B are illustrated as part of the risk calculation engine 214, the specific operations of the risk calculation engine 214 are not limited to machine learning. In some embodiments, the risk calculation engine may utilize other techniques, such as rule-based analysis in addition to, or instead of, machine learning to generate risk value 217. Risk value 217 may indicate, e.g., numerically, a determined risk associated with the transaction request 160.

At least in part based on the risk value 217, the fraud detection system 115 of the commerce platform system 110 may generate a decision 272 with respect to the transaction request 160. The decision 272 may refer to an approval status associated with the transaction request 160. For example, the commerce platform system 110 may decide to allow or deny the transaction request 160, though the embodiments of the present disclosure are not limited to a binary decision 272. As a non-limiting example only, if the risk value 217 exceeds a defined threshold, the decision 272 may indicate a denial of the transaction request 160, and if the risk value 217 is less than or equal to the defined threshold, the decision 272 may indicate acceptance of the transaction request 160. Though not expressly illustrated in FIG. 2A, the decision 272 may also be based on other factors, such as authorization requests made to issuers associated with the card 201 of the transaction request 160.

Once a decision 272 has been generated with respect to the transaction request 160, the transaction processing system 216 of the commerce platform system 110 may generate one or more transaction resolution messages 260 (e.g., authorizations, remunerations, etc.), which are returned to merchant platform system(s) 140. The transaction resolution messages 260 may reference the transaction associated with the transaction request 160. In some embodiments, the transaction resolution messages 260 may include the decision 272. The merchant platform system 140 may in turn provide transaction resolution messaging 262 to the merchant system 120 (e.g., indicating a success or failure of the transaction associated with the transaction request 160).

FIG. 2A illustrates an embodiment in which the risk trait 270 indicates that the commerce platform system 110 is to perform the risk calculation, but embodiments of the present disclosure are not limited to such a configuration. In some embodiments, other values of the risk trait 270 may indicate other behaviors for the commerce platform system 110. FIG. 2B is a block diagram illustrating the determination of the risk trait 270 having a second risk trait value, in accordance with some embodiments of the present disclosure. A description of elements of FIG. 2B that have been previously described will be omitted for brevity.

In FIG. 2B, a transaction request 160 is generated by a merchant system 120 and forwarded to the commerce platform system 110 by the merchant platform system 140 in a manner similar to that described with respect to FIG. 2A.

Commerce platform system 110 may receive the transaction request 160 at transaction processing system 216. In some embodiments, responsive to receiving the transaction request 160, the commerce platform system 110 may analyze the trait data store 170 to determine a value of the risk trait 270 within the trait data store 170. For example, the commerce platform system 110 (e.g., the transaction processing system 216 of the commerce platform system 110) may determine an account associated with the merchant platform system 140 and/or the merchant system 120 that forwarded the transaction request 160 (e.g., by analyzing account data store 175) and determine the risk trait 270 associated with the account from the trait data store 170.

In FIG. 2B, it is assumed that the risk trait 270 associated with the transaction request 160 has a second risk trait value that indicates that the commerce platform system 110 is to defer calculating a risk value associated with the transaction request 160. The second risk trait value of the risk trait 270 may be a numeric value, a text value, or any other mechanism with respect to the data value that may allow for the differentiation of discrete values of the data value. The second risk trait value of the risk trait 270 may be distinct and/or distinguishable from the first risk trait value of the risk trait 270.

In response to determining that the risk trait 270 has the second risk trait value (i.e., indicates that the commerce platform system 110 is to defer performing the risk calculation), the transaction processing system 216 may omit the operation of the fraud detection system 115 and the calculation of the risk value 217 (see, e.g., FIG. 2A).

The commerce platform system 110 (e.g., the transaction processing system 216 of the commerce platform system 110) may generate a decision 272 with respect to the transaction request 160. In some embodiments, if the risk trait 270 has the second risk trait value, the decision 272 may be automatically set to approve the transaction request 160. However, the embodiments of the present disclosure are not limited to such a configuration. In some embodiments, the decision 272 may still be generated, but may be based instead on non-risk-based factors. For example, the transaction request 160 may still be provided to an issuer associated with the card 201 of the transaction request 160 for authorization, and the decision 272 may be based on the result of the authorization request (e.g., whether sufficient funds exists and/or the card 201 is authorized) absent any determination of risk by the commerce platform system 110.

Once a decision 272 has been generated with respect to the transaction request 160, commerce platform system 110 may generate one or more transaction resolution messages 260 (e.g., authorizations, remunerations, etc.), which are returned to merchant platform system(s) 140 and reference the transaction associated with the transaction request 160.

In some embodiments, the transaction resolution messages 260 may include the decision 272 and/or an indication that the risk calculation has not been performed by the commerce platform system 110.

In response to the transaction resolution messages 260, the merchant platform system 140 may perform its own risk calculation 280. In other words, in response to the risk trait 270 having the second risk trait value, the calculation of risk may be performed by the merchant platform system 140 rather than the commerce platform system 110. The risk calculation 280 performed by the merchant platform system 140 may be different from that of the commerce platform system 110 and thus may provide a different result than the commerce platform system 110 for the same transaction request 160.

Based at least in part on the result of its own risk calculation 280, the merchant platform system 140 may in turn provide transaction resolution messaging 262 to the merchant system 120 (e.g., indicating a success or failure of the transaction associated with the transaction request 160). For example, if the risk calculation 280 performed by the merchant platform system 140 results in a determined risk that is too high, the transaction request 160 may be denied, and if the risk calculation 280 results in a determined risk that is deemed acceptable by the merchant platform system 140, the transaction request 160 may be approved.

In FIG. 2B, it is described that the risk calculation 280 is performed after the transaction request 160 is forwarded to the commerce platform system 110, but the embodiments of the present disclosure are not limited to such a configuration. In some embodiments, the risk calculation 280 may be performed before or concurrently with the operations of the commerce platform system 110.

FIG. 2B illustrates an embodiment in which the risk trait 270 indicates that the commerce platform system 110 is to defer the risk calculation, but embodiments of the present disclosure are not limited to such a configuration. In some embodiments, other values of the risk trait 270 may indicate other behaviors for the commerce platform system 110. FIG. 2C is a block diagram illustrating the determination of the risk trait 270 having a third risk trait value, in accordance with some embodiments of the present disclosure. A description of elements of FIG. 2C that have been previously described will be omitted for brevity.

In FIG. 2C, a transaction request 160 is generated by a merchant system 120 and forwarded to the commerce platform system 110 by the merchant platform system 140 in a manner similar to that described with respect to FIG. 2A.

Commerce platform system 110 may receive the transaction request 160 at transaction processing system 216. In some embodiments, responsive to receiving the transaction request 160, the commerce platform system 110 may analyze the trait data store 170 to determine a value of the risk trait 270 within the trait data store 170. For example, the commerce platform system 110 (e.g., the transaction processing system 216 of the commerce platform system 110) may determine an account associated with the merchant platform system 140 and/or the merchant system 120 that forwarded the transaction request 160 (e.g., by analyzing account data store 175) and determine the risk trait 270 associated with the account from the trait data store 170.

In FIG. 2C, it is assumed that the risk trait 270 associated with the transaction request 160 has a third risk trait value that indicates that the commerce platform system 110 is to provide a risk recommendation 290 associated with the transaction request 160 to the merchant platform system 140. The third risk trait value of the risk trait 270 may be a numeric value, a text value, or any other mechanism with respect to the data value that may allow for the differentiation of discrete values of the data value. The third risk trait value of the risk trait 270 may be distinct and/or distinguishable from the first and second risk trait values of the risk trait 270 described with respect to FIGS. 2A and 2B.

In response to determining that the risk trait 270 has the third risk trait value (i.e., indicates that the commerce platform system 110 is to provide a risk recommendation 290), the transaction processing system 216 may provide elements of transaction request 160 to fraud detection system 115. Fraud detection system 115 may utilize a risk calculation engine 214 to generate a risk value 217 that is associated with the transaction request 160 (e.g., as part of an authentication operation of the commerce platform system 110).

In some embodiments, fraud detection system 115 may utilize one or more machine learning (ML) engines 214A, 214B and/or transaction data history 219 to generate the risk value 217 based on the transaction request 160, as described herein with respect to FIG. 2A. As such, a duplicate description thereof will be omitted.

At least in part based on the risk value 217, the fraud detection system 115 of the commerce platform system 110 may generate a risk recommendation 290 with respect to the transaction request 160. For example, the fraud detection system 115 of the commerce platform system 110 may recommend allowing or denying the transaction request 160, though the embodiments of the present disclosure are not limited to a binary decision 272. As a non-limiting example only, if the risk value 217 exceeds a defined threshold, the risk recommendation 290 may be to deny the transaction request 160, and if the risk value 217 is less than or equal to the defined threshold, the risk recommendation 290 may be to allow the transaction request 160. Though not illustrated in FIG. 2A, the risk recommendation 290 may also be based on other factors, such as authorization requests made to issuers associated with the card 201 of the transaction request 160.

Once a risk recommendation 290 has been generated on the transaction request 160, the fraud detection system 115 may provide the risk recommendation to the transaction processing system 216. The transaction processing system 216 may provide the risk recommendation 290 to merchant platform system 140 and reference the transaction associated with the transaction request 160.

In response to the risk recommendation 290, the merchant platform system 140 may perform its own risk calculation 280. In some embodiments, the risk calculation 280 may be based, in part, on the risk recommendation 290 generated by the commerce platform system 110. In other words, when the risk trait 270 has the third risk trait value, the calculation of risk may be performed by both the merchant platform system 140 and the commerce platform system 110. The risk calculation 280 performed by the merchant platform system 140 may be different (e.g., may utilize different data and/or different operations) from that of the commerce platform system 110 and thus may provide a different result than the commerce platform system 110 for the same transaction request 160. In some embodiments, the merchant platform system 140 may be responsible for reconciling any differences between the risk calculated by risk calculation operations 280 and the risk recommendation 290.

Based at least in part on the result of its own risk calculation 280 and the risk recommendation 290, the merchant platform system 140 may in turn provide transaction resolution messaging 262 to the merchant system 120 (e.g., indicating a success or failure of the transaction associated with the transaction request 160). For example, if the risk calculation results in a determined risk that is too high in light of the risk recommendation 290, the transaction request 160 may be denied, and if the risk calculation results in a determined risk that is deemed acceptable by the merchant platform system 140 in light of the risk recommendation 290, the transaction request 160 may be approved.

The embodiments of FIGS. 2A, 2B, and 2C illustrate that the value of risk trait 270 may alter the behavior of the commerce platform system 110 and/or the merchant platform system 140 with respect to calculating risk associated with a particular transaction request 160. It will be understood that different merchant platform systems 140 operating with the commerce platform system 110 may have different values for the risk trait 270 within the trait data store 170 of the commerce platform system 110. For example, different merchant platform systems 140 may be associated with different accounts of the commerce platform system 110, and the different accounts may be associated with different trait data store 170, including different values for the risk trait 270. Thus, different merchant platform systems 140 may experience different behaviors with respect to the commerce platform system 110 based, in part, on the value of the risk trait 270.

In some embodiments, the behavior with respect to risk calculation by the commerce platform system 110 for a particular merchant platform system 140 may be changed by altering the value of the risk trait 270 associated with that particular merchant platform system 140. For example, altering the risk trait 270 with respect to the merchant platform system 140 from the second risk trait value to the first risk trait value may switch the responsibility for calculating the risk associated with a particular transaction request 160 from the merchant platform system 140 to the commerce platform system 110.

Figure 3A:
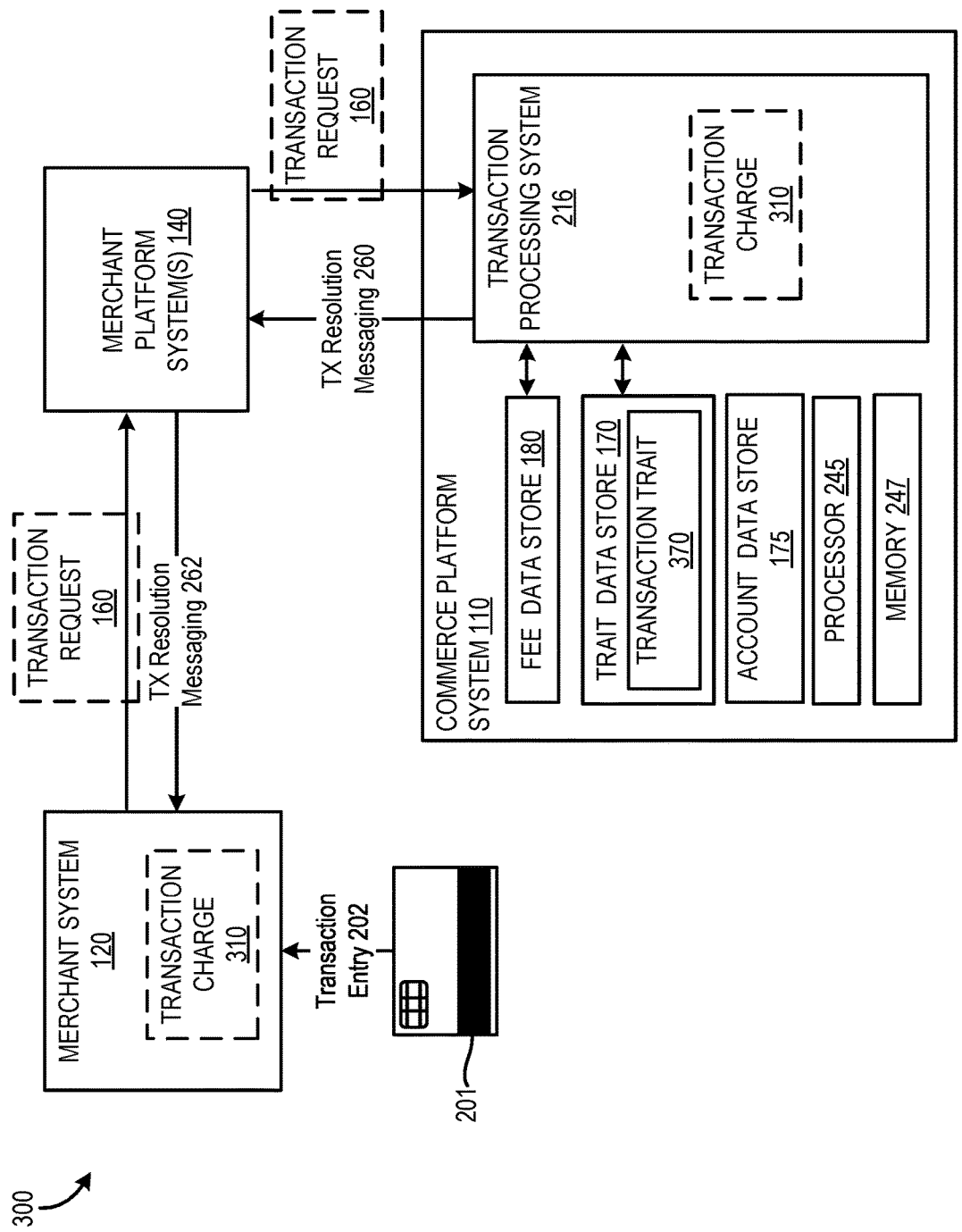
FIG. 3A is a block diagram illustrating the determination of a transaction trait having a first transaction trait value, in accordance with some embodiments of the present disclosure.
Figure 3B:
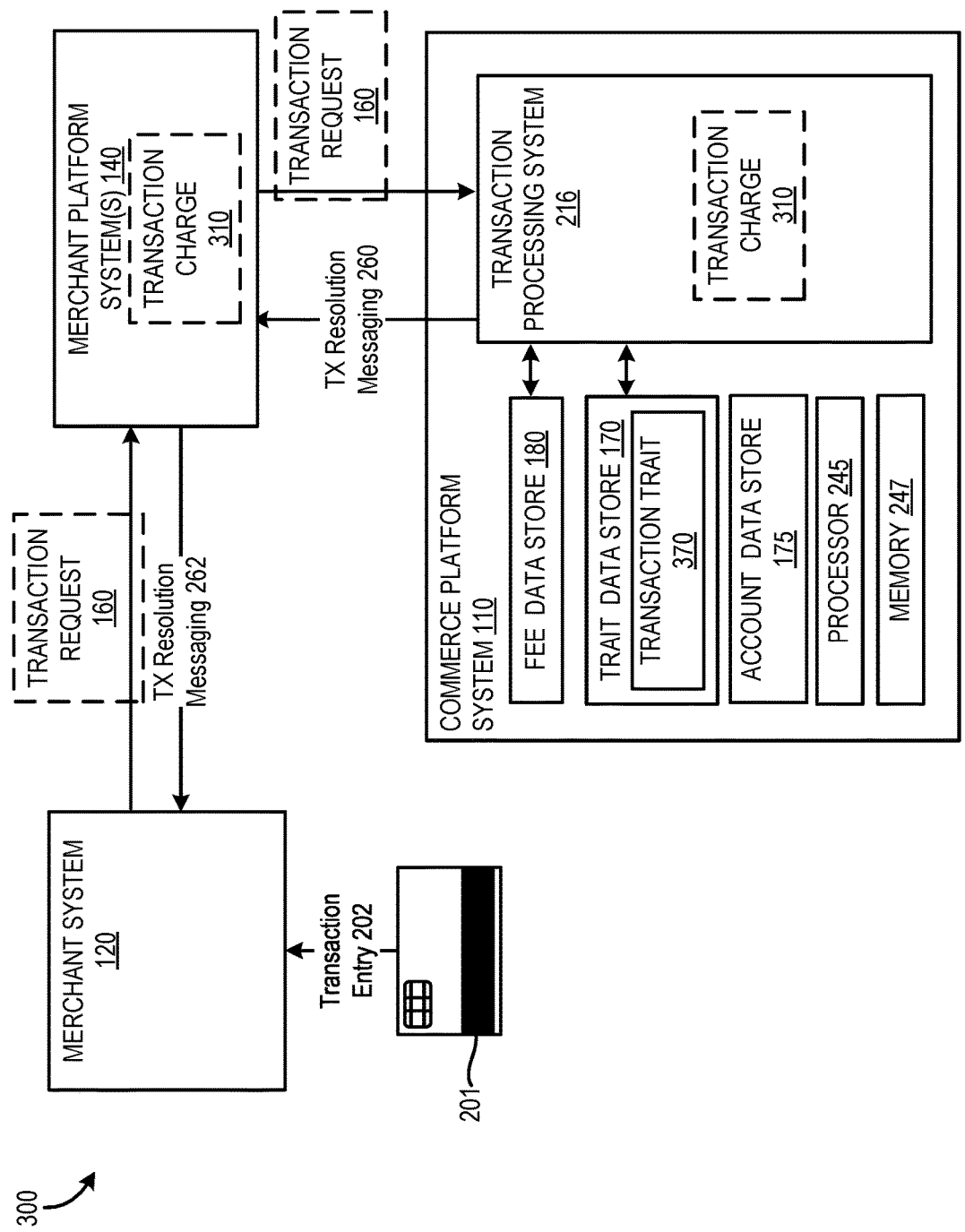
FIG. 3B is a block diagram illustrating the determination of a transaction trait having a second transaction trait value, in accordance with some embodiments of the present disclosure.

FIGS. 3A and 3B are block diagrams of a system 300 utilizing a transaction trait 370, in accordance with some embodiments of the present disclosure. FIG. 3A is a block diagram illustrating the behavior of the transaction trait 370 having a first transaction trait value, in accordance with some embodiments of the present disclosure. A description of elements of FIG. 3A that have been previously described herein will be omitted for brevity.

System 300 may include a commerce platform system 110, a merchant platform system 140, and a merchant system 120. The commerce platform system 110, the merchant platform system 140, and the merchant system 120 may be similar to those described herein with respect to FIGS. 1 and 2A.

In FIG. 3A, a transaction request 160 is generated by a merchant system 120 in response to a transaction data entry 202 and forwarded to the commerce platform system 110 by the merchant platform system 140 in a manner similar to that described with respect to FIG. 2A.

Commerce platform system 110 may receive the transaction request 160 at transaction processing system 216. In some embodiments, responsive to receiving the transaction request 160, the commerce platform system 110 may analyze the trait data store 170 to determine a value of a transaction trait 370 within the trait data store 170. For example, the commerce platform system 110 (e.g., the transaction processing system 216 of the commerce platform system 110) may determine an account associated with the merchant platform system 140 and/or the merchant system 120 that forwarded the transaction request 160 (e.g., by analyzing account data store 175) and determine the transaction trait 370 associated with the account from the trait data store 170.

The transaction trait 370 may determine how a transaction charge 310 is calculated for the transaction request 160 by the commerce platform system 110. A value may be associated with the transaction trait 370 for each of the accounts within the account data (see FIG. 1). To determine the value of the transaction trait 370, the transaction processing system 216 of the commerce platform system 110 may determine a value associated with the transaction trait 370 of the trait data store 170 for the account associated with the merchant platform system 140 and/or the merchant system 120 that forwarded the transaction request 160.

In FIG. 3A, it is assumed that the transaction trait 370 associated with the transaction request 160 has a first transaction trait value that indicates that the commerce platform system 110 is to generate a transaction charge 310 associated with the transaction request 160 to be provided to the merchant system 120. The first transaction trait value of the transaction trait 370 may be a numeric value, a text value, or any other mechanism with respect to the data value that may allow for the differentiation of discrete values of the data value.

The transaction processing system 216 of the commerce platform system 110 may generate the transaction charge 310 based on characteristics of the transaction request 160. For example, the commerce platform system 110 (e.g., the transaction processing system 216 of the commerce platform system 110) may determine a fee amount and/or fee structure associated with the merchant platform system 140 and/or the merchant system 120 that forwarded the transaction request 160 (e.g., by analyzing fee data store 180) and determine the transaction charge 310 based on the fee data store 180 and the transaction request 160. For example, the transaction request 160 may be associated with a financial transaction, and the transaction charge 310 may be a percentage of the value of the financial transaction. However, the embodiments of the present disclosure are not limited to such a configuration. In some embodiments, the transaction charge 310 may be a fixed fee, or a combination of a fixed fee and a percentage.

In some embodiments, the transaction charge 310 may be a separate fee or may be an amount added to the value associated with the transaction request 160. For example, the transaction charge 310 may be added to the value associated with the transaction request 160 before the amount of the transaction request 160 is submitted to a card issuer associated with the transaction request 160.

Though not illustrated in FIG. 3A, other operations of the commerce platform system 110 (e.g., risk calculation and/or authentication operations) may be performed associated with the transaction request 160. Once those operations are complete with respect to the transaction request 160, commerce platform system 110 may generate transaction resolution messaging 260 (e.g., authorizations, remunerations, etc.), which may be returned to merchant platform system(s) 140 and reference the transaction associated with the transaction request 160.

In response to the transaction resolution messages 260, the merchant platform system 140 may perform additional operations related to the transaction request 160. Merchant platform system 140 may in turn provide transaction resolution messaging 262 to the merchant system 120 (e.g., indicating a success or failure of the transaction associated with the transaction request 160). The transaction resolution messaging 262 may include the transaction charge 310 to the merchant system 120. Thus, the merchant system 120 may be responsible for paying the transaction charge 310 associated with the transaction request 160.

FIG. 3A illustrates an embodiment in which the transaction trait 370 indicates that the commerce platform system 110 is to pass a transaction charge 310 associated with a particular transaction request 160 back to the merchant system 120 originating the transaction request 160, but embodiments of the present disclosure are not limited to such a configuration. In some embodiments, other values of the transaction trait 370 may indicate other behaviors for the commerce platform system 110 with respect to the transaction charge 310. FIG. 3B is a block diagram illustrating the determination of the transaction trait 370 having a second transaction trait value, in accordance with some embodiments of the present disclosure. A description of elements of FIG. 3B that have been previously described will be omitted for brevity.

In FIG. 3B, a transaction request 160 is generated by a merchant system 120 and forwarded to the commerce platform system 110 by the merchant platform system 140 in a manner similar to that described with respect to FIG. 2A.

Commerce platform system 110 may receive the transaction request 160 at transaction processing system 216. In some embodiments, responsive to receiving the transaction request 160, the transaction processing system 216 of the commerce platform system 110 generates a transaction charge 310 in a manner similar to that described with respect to FIG. 3A (e.g., with reference to the fee data store 180 and/or the transaction request 160). In addition, the commerce platform system 110 may analyze the trait data store 170 to determine a value of the transaction trait 370 within the trait data store 170. For example, the commerce platform system 110 (e.g., the transaction processing system 216 of the commerce platform system 110) may determine an account associated with the merchant platform system 140 and/or the merchant system 120 that forwarded the transaction request 160 (e.g., by analyzing account data store 175) and determine the transaction trait 370 associated with the account from the trait data store 170.

In FIG. 3B, it is assumed that the transaction trait 370 associated with the transaction request 160 has a second transaction trait value that indicates that the commerce platform system 110 is to provide the associated transaction charge 310 to the merchant platform system 140. The second transaction trait value of the transaction trait 370 may be a numeric value, a text value, or any other mechanism with respect to the data value that may allow for the differentiation of discrete values of the data value. The second transaction trait value of the transaction trait 370 may be distinct and/or distinguishable from the first transaction trait value of the transaction trait 370.

Though not illustrated in FIG. 3B, other operations of the commerce platform system 110 (e.g., risk calculation and/or authentication operations) may be performed associated with the transaction request 160. Once those operations are complete with respect to the transaction request 160, commerce platform system 110 may generate one or more transaction resolution messages 260 (e.g., authorizations, remunerations, etc.), which are returned to merchant platform system(s) 140 and reference the transaction associated with the transaction request 160.

The transaction resolution message 260 may include the transaction charge 310 to the merchant platform system 140. Thus, the merchant platform system 140 may be responsible for paying the transaction charge 310 associated with the transaction request 160. In some embodiments, the transaction charge 310 may be a flat fee to the merchant platform system 140, a fee based on a percentage of the financial transaction associated with the transaction request 160, or a combination of a flat fee and a percentage value. In some embodiments, the transaction charge 310 may be separated from an amount assessed to the merchant system 120. In some embodiments, the merchant platform system 140 may be responsible for providing the transaction charge 310 to the merchant system 120.

The embodiments of FIGS. 3A and 3B illustrate that the value of transaction trait 370 may alter the behavior of the commerce platform system 110 with respect to how a transaction charge 310 associated with a transaction request 160 is assessed. It will be understood that different merchant platform systems 140 operating with the commerce platform system 110 may have different values for the transaction trait 370 within the trait data store 170 of the commerce platform system 110. For example, different merchant platform systems 140 may be associated with different accounts of the commerce platform system 110, and the different accounts may be associated with different trait data store 170, including different values for the transaction trait 370. Thus, different merchant platform systems 140 may experience different behaviors with respect to the commerce platform system 110 based, in part, on the value of the transaction trait 370.

In some embodiments, the behavior with respect to transaction charge generation by the commerce platform system 110 for a particular merchant platform system 140 may be changed by altering the value of the transaction trait 370 associated with that particular merchant platform system 140. For example, by altering the transaction trait 370 with respect to the merchant platform system 140 from the second transaction trait value to the first transaction trait value may switch the responsibility for a transaction charge 310 associated with a transaction request 160 from the merchant platform system 140 to the merchant system 120. For example, when the merchant system 120 is responsible for the transaction charge 310, the transaction charge 310 may be provided by the commerce platform system 110 directly to the merchant system 120. In contrast, when the merchant platform system 140 is responsible for the transaction charge 310, the commerce platform system 110 may provide the transaction charge 310 to the merchant platform system 140 rather than the merchant system 120. The merchant platform system 140 may then be responsible for determining whether to recoup the transaction charge 310 from the merchant system 120. This may allow the merchant platform system 140 to have greater control of the allocation of these charges.

Figure 4A:
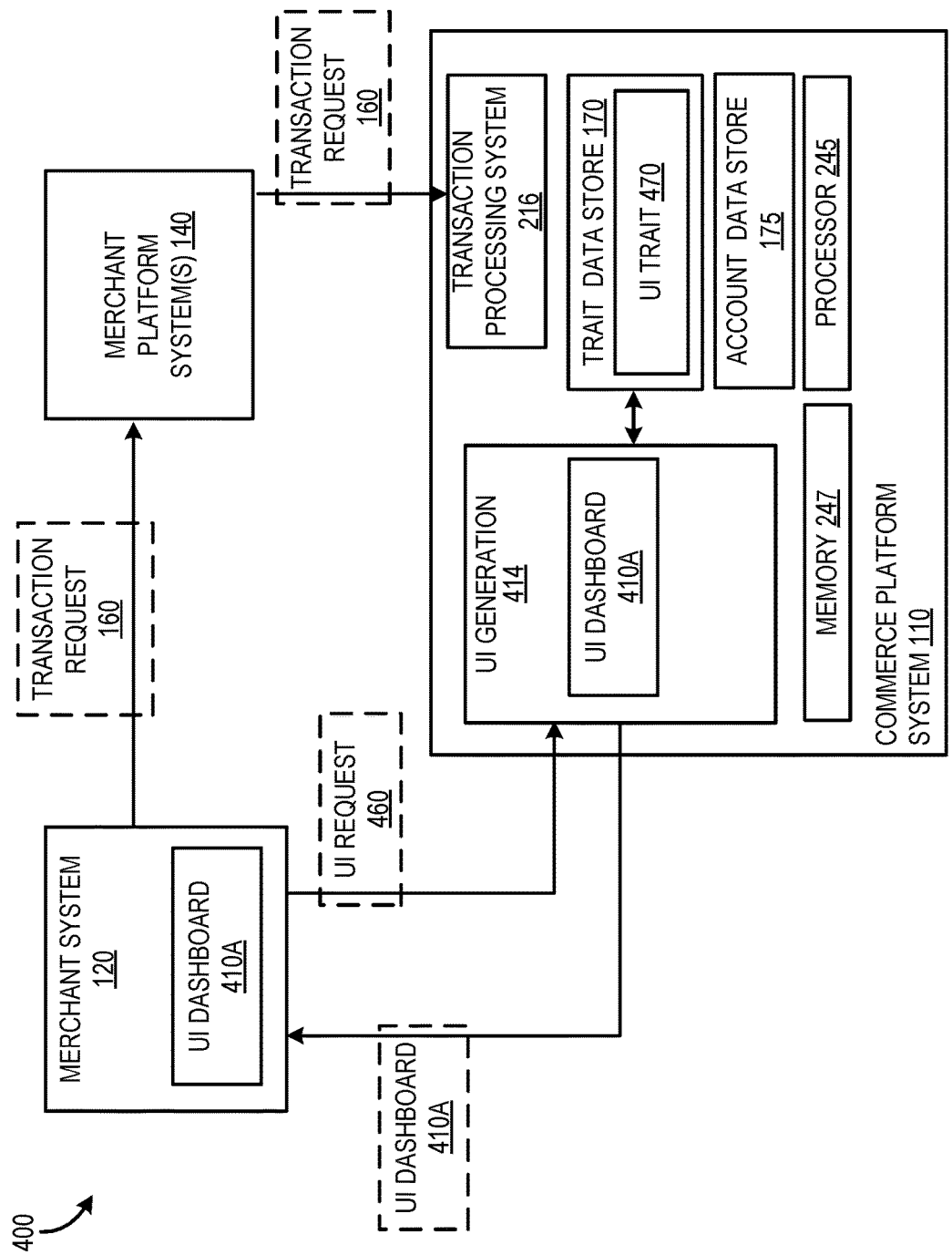
FIG. 4A is a block diagram illustrating the determination of a UI trait having a first UI trait value, in accordance with some embodiments of the present disclosure.
Figure 4B:
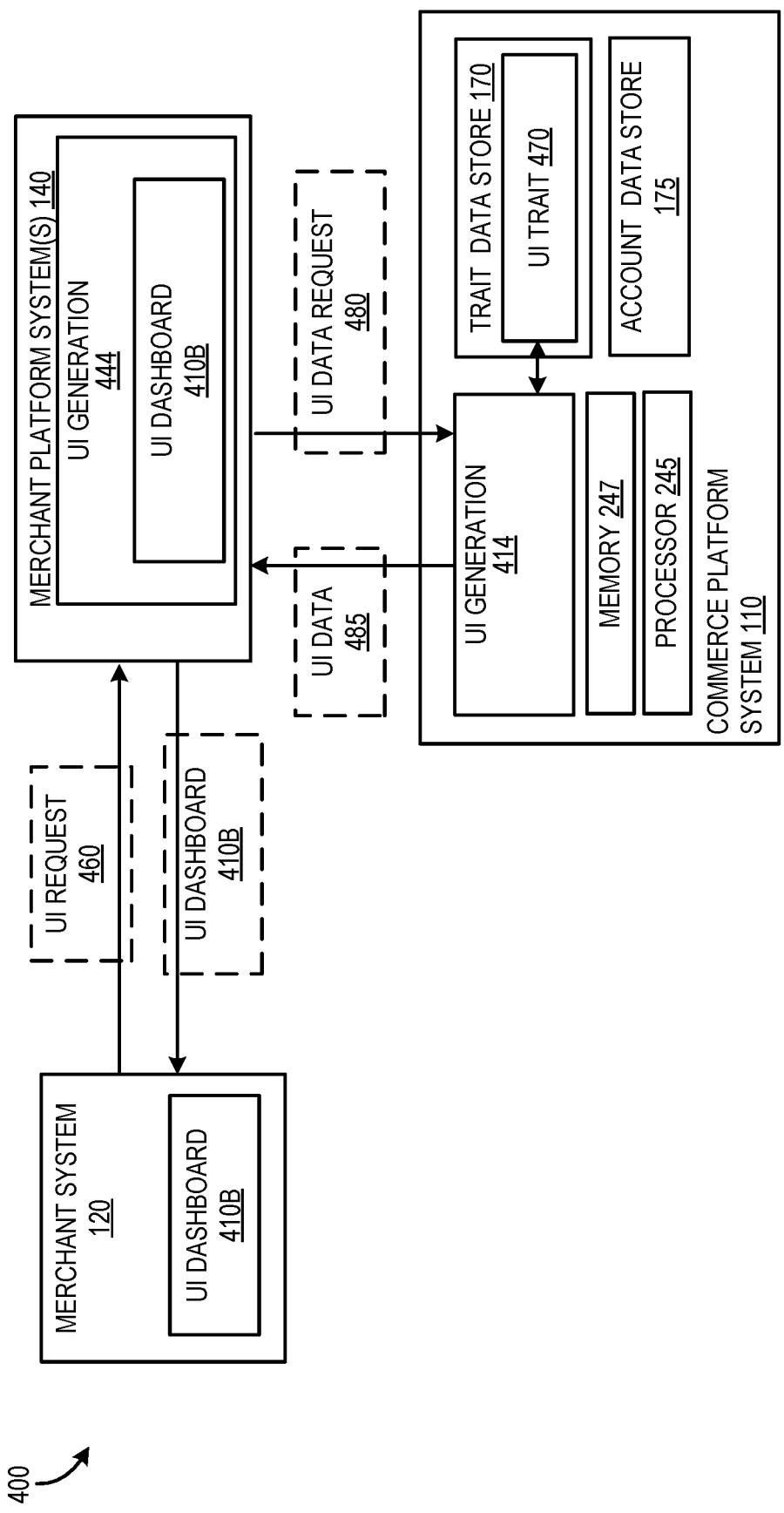
FIG. 4B is a block diagram illustrating the determination of a UI trait having a second UI trait value, in accordance with some embodiments of the present disclosure.
Figure 4C:
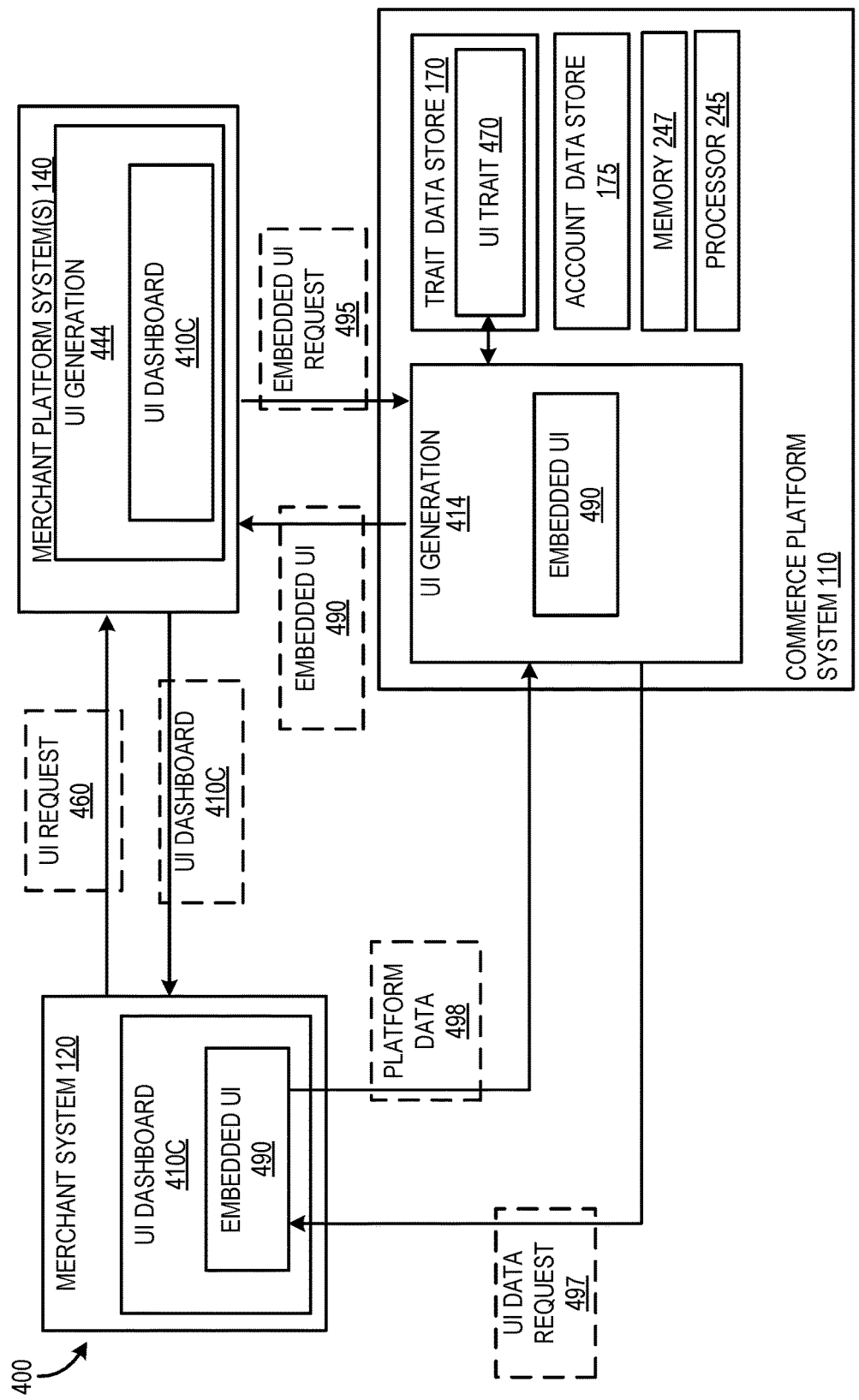
FIG. 4C is a block diagram illustrating the determination of a UI trait having a third UI trait value, in accordance with some embodiments of the present disclosure.

FIGS. 4A, 4B, and 4C are block diagrams of a system 400 utilizing a UI trait 470, in accordance with some embodiments of the present disclosure. FIG. 4A is a block diagram illustrating the determination of the UI trait 470 having a first UI trait value, in accordance with some embodiments of the present disclosure. A description of elements of FIG. 4A that have been previously described herein will be omitted for brevity.

System 400 may include a commerce platform system 110, a merchant platform system 140, and a merchant system 120. The commerce platform system 110, the merchant platform system 140, and the merchant system 120 may be similar to those described herein with respect to FIGS. 1 and 2A.

In some embodiments, a UI dashboard 410A may be provided to the merchant system 120 as part of the association of the merchant system 120 with the merchant platform system 140 and/or the commerce platform system 110. The UI dashboard 410A may illustrate information for the merchant system 120 regarding an account of the merchant system 120 with the merchant platform system 140 and/or the commerce platform system 110. For example, the UI dashboard 410A may provide information regarding amounts due the merchant system 120, amounts owed by the merchant system 120, actions taken by the commerce platform system 110 and/or the merchant platform system 140 on behalf of the merchant system 120, alerts for the merchant system 120, and the like.

In some embodiments, the generation of the UI dashboard 410A may be controlled and/or affected by one or more traits of the trait data store 170. For example, a UI trait 470 of the trait data store 170 may control whether the UI dashboard 410A is prepared by the commerce platform system 110, the merchant platform system 140, or a combination of the two.

In FIG. 4A, it is illustrated that the UI dashboard 410A may be generated responsive to a query and/or operation of the merchant system 120. For example, the merchant system 120 may transmit a UI request 460 for a status update for its account with the merchant platform system 140 and/or the commerce platform system 110.

Referring to FIG. 4A, the UI request 460 may be transmitted by the merchant system 120 to the commerce platform system 110. The commerce platform system 110 may receive the UI request 460 at UI generation engine 414. In some embodiments, responsive to receiving the UI request 460, the commerce platform system 110 may analyze the trait data store 170 to determine a value of a UI trait 470 within the trait data store 170. The UI trait 470 may determine how the UI dashboard 410A is generated for the merchant system 120. A value may be associated with the UI trait 470 for each of the accounts within the account data (see FIG. 1). To determine the value of the UI trait 470, the commerce platform system 110 may determine a value associated with the UI trait 470 of the trait data store 170 for the account associated with the merchant system 120 and/or the merchant platform system 140 with which the merchant system 120 is associated. For example, the commerce platform system 110 (e.g., UI generation engine 414 of the commerce platform system 110) may determine an account associated with the merchant platform system 140 and/or the merchant system 120 that forwarded the UI request 460 (e.g., by analyzing account data store 175) and determine the UI trait 470 associated with the account from the trait data store 170.

In FIG. 4A, it is assumed that the UI trait 470 associated with the merchant system 120 has a first UI trait value that indicates that the commerce platform system 110 is to generate the UI dashboard 410A for the merchant system 120. The first UI trait value of the UI trait 470 may be a numeric value, a text value, or any other mechanism with respect to the data value that may allow for the differentiation of discrete values of the data value. In some embodiments, the first UI trait value may be one of a set of categorized values. For example, the UI trait 470 may have one of several enumerated values, such as "premium," "regular," "limited," or the like, and the first UI trait value may be one of these enumerated values.

The UI generation engine 414 of the commerce platform system 110 may generate the UI dashboard 410A based on information associated with the merchant system 120 that is maintained by the commerce platform system 110 and/or accessible by the commerce platform system 110. The UI dashboard 410A may be, for example, a web page that is transmitted over hypertext transfer protocol (HTTP) to the merchant system 120, though embodiments of the present disclosure are not limited thereto.

In some embodiments, the generation of the UI dashboard 410A and/or the transmission of the UI dashboard 410A responsive to the UI request 460 may be based on the determination that the UI trait 470 associated with the merchant system 120 has the first UI trait value. In some embodiments, if the UI trait 470 associated with the merchant system 120 has a value different from the first UI trait value, the commerce platform system 110 (or the UI generation engine 414 of the commerce platform system 110) may refuse the UI request 460.

Though illustrated in response to a direct UI request 460, the generation of the UI dashboard 410A may be provided responsive to other events. For example, in some embodiments, the UI dashboard 410A may be provided responsive to a transaction request 160. For example, a transaction request 160 may be received and processed by the transaction processing system 216 of the commerce platform system 110 in a manner similar to that described herein with respect to FIG. 2A. For example, a risk calculation engine 214 (see FIG. 2A) may analyze the transaction request 160 and perform one or more actions responsive thereto. In some embodiments, the UI dashboard 410A may indicate actions taken as part of the processing of the transaction request 160. For example, the UI dashboard 410A generated by the commerce platform system 110 may transmit a communication to the UI dashboard 410A for the merchant system 120 that indicates a risk action (e.g., a refusal or acceptance of the transaction request 160, a locking of an account associated with the transaction request 160, etc.) taken with regard to the transaction request 160 in response to a risk value associated with the transaction request 160 exceeding a particular threshold.

FIG. 4A illustrates an embodiment in which the UI trait 470 indicates that the commerce platform system 110 is to manage the generation of the UI dashboard 410A for the merchant system 120. In some embodiments, other values of the UI trait 470 may indicate other behaviors for the commerce platform system 110 with respect to a dashboard presented to the merchant platform system. FIG. 4B is a block diagram illustrating the determination of the UI trait 470 having a second UI trait value, in accordance with some embodiments of the present disclosure. A description of elements of FIG. 4B that have been previously described will be omitted for brevity.

In FIG. 4B, a UI dashboard 410B may be generated by the merchant platform system 140 responsive to a query and/or operation of the merchant system 120. For example, the merchant system 120 may transmit a UI request 460 for a status update for its account to the merchant platform system 140. The UI dashboard 410B may illustrate information for the merchant system 120 regarding an account of the merchant system 120 with the merchant platform system 140 and/or the commerce platform system 110. For example, the UI dashboard 410B may provide information regarding amounts due the merchant system 120, amounts owed by the merchant system 120, actions taken by the commerce platform system 110 and/or the merchant platform system 140 on behalf of the merchant system 120, alerts for the merchant system 120, and the like.

The merchant platform system 140 may receive the UI request 460 at UI generation engine 444 of the merchant platform system 140. In response to receiving the UI request 460, the merchant platform system 140 may transmit a UI data request 480 to the commerce platform system 110. The UI data request 480 may request UI data 485 from the commerce platform system 110 to enable the merchant platform system 140 to generate UI dashboard 410B. In some embodiments, the UI data request 480 may be received by the UI generation engine 414 of the commerce platform system 110.

In some embodiments, responsive to receiving the UI data request 480, the UI generation engine 414 of the commerce platform system 110 may analyze the trait data store 170 to determine a value of a UI trait 470 within the trait data store 170. The UI trait 470 may determine how the UI dashboard 410B is generated for the merchant system 120. For example, the commerce platform system 110 (e.g., the UI generation engine 414 of the commerce platform system 110) may determine an account associated with the merchant platform system 140 and/or the merchant system 120 that forwarded the UI request 480 (e.g., by analyzing account data store 175) and determine the UI trait 470 associated with the account from the trait data store 170.

In FIG. 4B, it is assumed that the UI trait 470 associated with the merchant platform system 140 and/or the merchant system 120 has a second UI trait value that indicates that the merchant platform system 140 is to provide the UI dashboard 410B to the merchant system 120. The second UI trait value of the UI trait 470 may be a numeric value, a text value, or any other mechanism with respect to the data value that may allow for the differentiation of discrete values of the data value. The second UI trait value of the UI trait 470 may be distinct and/or distinguishable from the first UI trait value of the UI trait 470.

In response to determining that the merchant platform system 140 is to provide the UI dashboard 410B to the merchant system 120 based on the value of the UI trait 470, the UI generation engine 414 of the commerce platform system 110 may provide UI data 485 to the merchant platform system 140. The UI data 485 may include data related to the account associated with the merchant system 120 that may be maintained by the commerce platform system 110. The UI generation engine 444 of the merchant platform system 140 may utilize the UI data 485 to generate the UI dashboard 410B for the merchant system 120.

FIG. 4C is a block diagram illustrating the determination of a UI trait 470 having a third UI trait value, in accordance with some embodiments of the present disclosure. A description of elements of FIG. 4C that have been previously described will be omitted for brevity.

In FIG. 4C, a UI dashboard 410C may be generated by the merchant platform system 140 responsive to a query and/or operation of the merchant system 120. For example, the merchant system 120 may transmit a UI request 460 for a status update for its account to the merchant platform system 140. The UI dashboard 410C may illustrate information for the merchant system 120 regarding an account of the merchant system 120 with the merchant platform system 140 and/or the commerce platform system 110. For example, the UI dashboard 410C may provide information regarding amounts due the merchant system 120, amounts owed by the merchant system 120, actions taken by the commerce platform system 110 and/or the merchant platform system 140 on behalf of the merchant system 120, alerts for the merchant system 120, and the like.

The merchant platform system 140 may receive the UI request 460 at UI generation engine 444 of the merchant platform system 140. In some embodiments, the UI dashboard 410C may include data generated by the merchant platform system 140 as well as an embedded portion that includes data generated by the commerce platform system 110. The embedded portion of the UI dashboard 410C may include, for example, an embedded UI 490 provided by the commerce platform system 110. In response to receiving the UI request 460, the merchant platform system 140 may transmit an embedded UI data request 495 to the UI generation engine 414 of the commerce platform system 110. The embedded UI data request 495 may request the embedded UI 490 from the commerce platform system 110 to enable the UI generation engine 444 of the merchant platform system 140 to generate the UI dashboard 410C.

In some embodiments, responsive to receiving the embedded UI data request 495, the UI generation engine 414 of the commerce platform system 110 may analyze the trait data store 170 to determine a value of a UI trait 470 within the trait data store 170. The UI trait 470 may determine how the UI dashboard 410C is generated for the merchant system 120. For example, the commerce platform system 110 (e.g., UI generation engine 414 of the commerce platform system 110) may determine an account associated with the merchant platform system 140 and/or the merchant system 120 that forwarded the UI request 460 (e.g., by analyzing account data store 175) and determine the UI trait 470 associated with the account from the trait data store 170.

In FIG. 4C, it is assumed that the UI trait 470 associated with the merchant platform system 140 and/or the merchant system 120 has a third UI trait value that indicates that the merchant platform system 140 is to provide the UI dashboard 410C that includes the embedded UI 490 from the commerce platform system 110 to the merchant system 120. The third UI trait value of the UI trait 470 may be a numeric value, a text value, or any other mechanism with respect to the data value that may allow for the differentiation of discrete values of the data value. The third UI trait value of the UI trait 470 may be distinct and/or distinguishable from the first and second UI trait values of the UI trait 470.

In response to determining that the merchant platform system 140 is to provide the UI dashboard 410C containing the embedded UI 490 based on the value of the UI trait 470, the commerce platform system 110 (e.g., the UI generation engine 414 of the commerce platform system 110) may provide an embedded UI 490 to the merchant platform system 140 (e.g., by a UI generation engine 414 of the commerce platform system 110). The embedded UI 490 may include code and/or instructions that may be configured to access the commerce platform system 110 from within the UI dashboard 410C. The UI generation engine 444 of the merchant platform system 140 may utilize the embedded UI 490 to generate the UI dashboard 410C for the merchant system 120.

As part of displaying the UI dashboard 410C from the merchant platform system 140 on the merchant system 120, the embedded UI may execute and transmit a UI data request 497 to the commerce platform system 110 to request additional platform data 498 from the commerce platform system 110 for display in the UI dashboard 410C.

In some embodiments, before providing the platform data 498 to the embedded UI 490, the UI generation engine 414 of the commerce platform system 110 may again check the UI trait 470 of the trait data store 170 to verify that it is set to the third trait value. In other words, the commerce platform system 110 may first verify that the account associated with the merchant system 120 and/or the merchant platform system 140 (e.g., by reference to account data store 170) are configured for the UI dashboard 410C to be generated by the UI generation engine 414 utilizing the embedded UI 490.

The embodiments of FIGS. 4A, 4B, and 4C illustrate that the value of the UI trait 470 may alter the behavior of the commerce platform system 110 with respect to how a UI dashboard 410A, 410B, 410C for a merchant system 120 is generated. It will be understood that different merchant systems 120 operating with the commerce platform system 110 may have and/or be associated with different values for the UI trait 470 within the trait data store 170 of the commerce platform system 110. For example, different merchant systems 120 may be associated with different accounts of the commerce platform system 110, and the different accounts may be associated with different trait data store 170, including different values for the UI trait 470. Thus, different merchant systems 120 may experience different behaviors with respect to the commerce platform system 110 based, in part, on the value of the UI trait 470.

In some embodiments, the behavior with respect to UI dashboard generation by the commerce platform system 110 for a particular merchant platform system 140 may be changed by altering the value of the UI trait 470 associated with that particular merchant platform system 140. For example, by altering the UI trait 470 with respect to the merchant platform system 140 from the second UI trait value to the first UI trait value may switch the responsibility for generating the UI dashboard 410B for a merchant system 120 from the merchant platform system 140 to the commerce platform system 110. By allowing the alteration of the UI behavior using the UI trait 470, the merchant platform system 140 may be provided more control over the user interface experience of its merchant systems 120. The UI trait 470 allows for this behavior to be quickly switched, without requiring specific configuration of the behavior or maintaining specific accounts having this functionality. In addition, the UI trait 470 may allow the commerce platform system 110 to avoid having multiple types of accounts, each having different types of UI behavior.

The various values of the UI trait 470 may be utilized to control whether a respective dashboard (e.g., UI dashboard 410A, 410B, 410C) is hosted by the merchant platform system 140 or the commerce platform system 110. By allowing for the merchant platform system 140 to control portions of the generation of the UI dashboard, additional customization may be allowed that provided varying levels of control for the UI dashboard with respect to customization, risk, on-boarding of merchant systems 120, and the like. In some embodiments, different values of the UI trait 470 may allow different levels of such control, allowing for quick customization for a given merchant platform system 140.

Figure 5A:
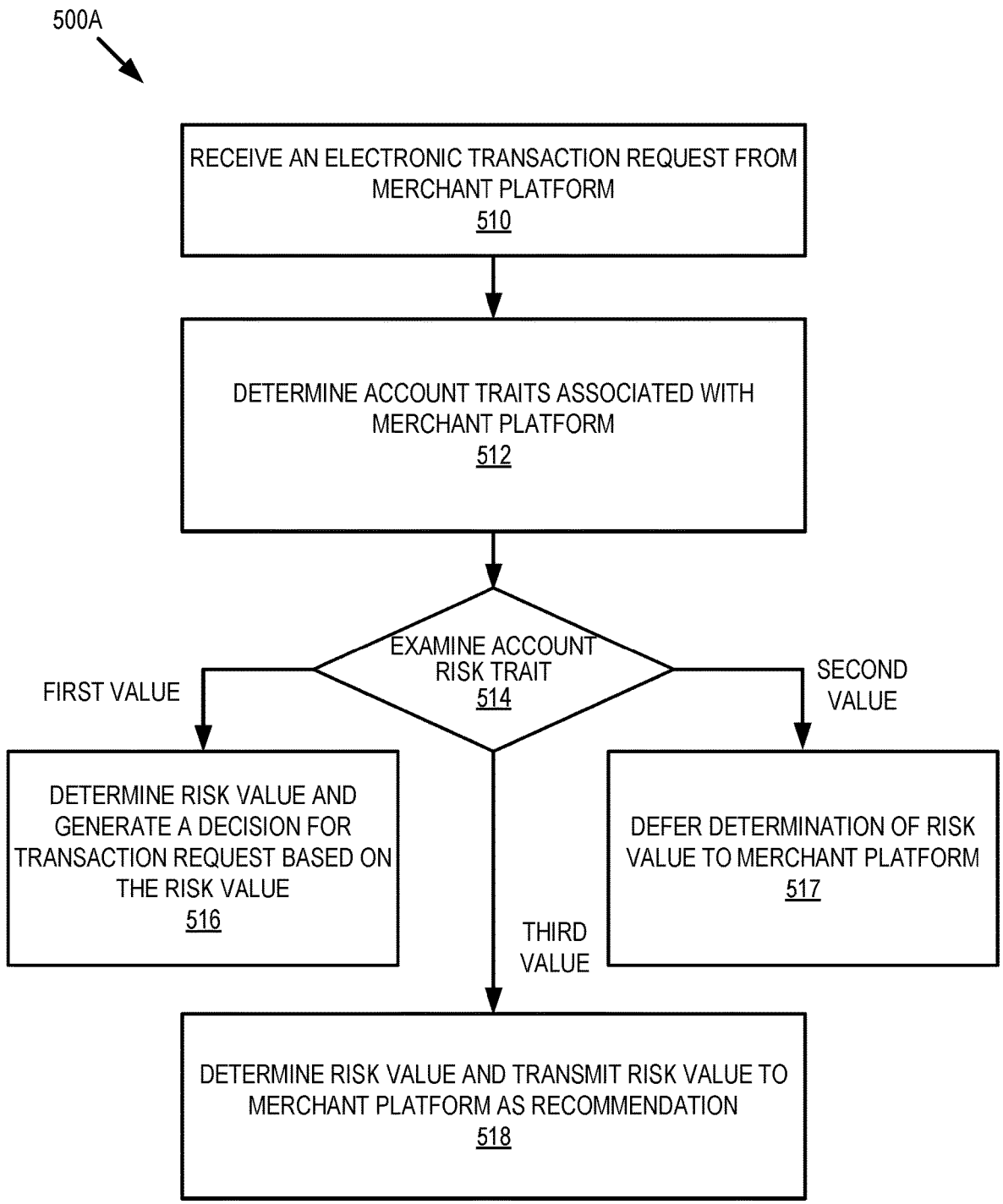
FIG. 5A is a flow diagram of one embodiment of a method for performing a risk calculation based on a value of a risk trait of a plurality of account trait data, in accordance with some embodiments of the present disclosure.

FIG. 5A is a flow diagram of one embodiment of a method 500A for performing a risk calculation based on a value of a risk trait 270 of a plurality of account trait data store 170, in accordance with some embodiments of the present disclosure. The method 500A is performed by processing logic that may comprise hardware (circuitry, dedicated logic, etc.), software (such as is run on a general purpose computer system or a dedicated machine), firmware, or a combination. In one embodiment, the method 500A is performed by a commerce platform system 110, as described herein. A description of elements of FIG. 5A that have described previously will be omitted for brevity.

Referring to FIG. 5A, as well as FIGS. 2A, 2B, and 2C, processing logic begins by receiving an electronic transaction request 160 from a merchant platform system 140 (processing block 510). In some embodiments, the electronic transaction request 160 is associated with a transaction that is a commercial transaction between a consumer and a merchant system 120 associated with the merchant platform system 140.

Processing logic determines account traits associated with the merchant platform system 140 (processing block 512). In some embodiments, account traits associated with the merchant platform system 140 may be a subset of a plurality of account trait data store 170 maintained by the commerce platform system 110.

Processing logic examines a risk trait 270 of the account traits (processing block 514). In some embodiments, processing logic identifies a value of the risk trait 270. In some embodiments, the risk trait 270 may be set to one of a plurality of values, as discussed herein, for example, by FIGS. 2A to 2C. For example, different values of the risk trait 270 may be set to indicate that risk analysis is to be performed by the commerce platform system 110, that risk analysis is to be performed by the merchant platform system 140, and/or that risk analysis may be performed by the merchant platform system 140 and a risk recommendation may be provided by the commerce platform system 110.

In response to determining that the risk trait 270 has a first value, the processing logic may determine a risk value 217 associated with the transaction request 160 and may generate a decision 272 for the transaction request 160 based on the risk value 217 (processing block 516).

In response to determining that the risk trait 270 has a second value, the processing logic may defer a determination of a risk value associated with the transaction request 160 to the merchant platform system 140 (processing block 517).

In response to determining that the risk trait 270 has a third value, the processing logic may determine risk value 217 associated with the transaction request 160 and may transmit the risk value 217 to the merchant platform system 140 as a risk recommendation 290 (processing block 518).

Figure 5B:
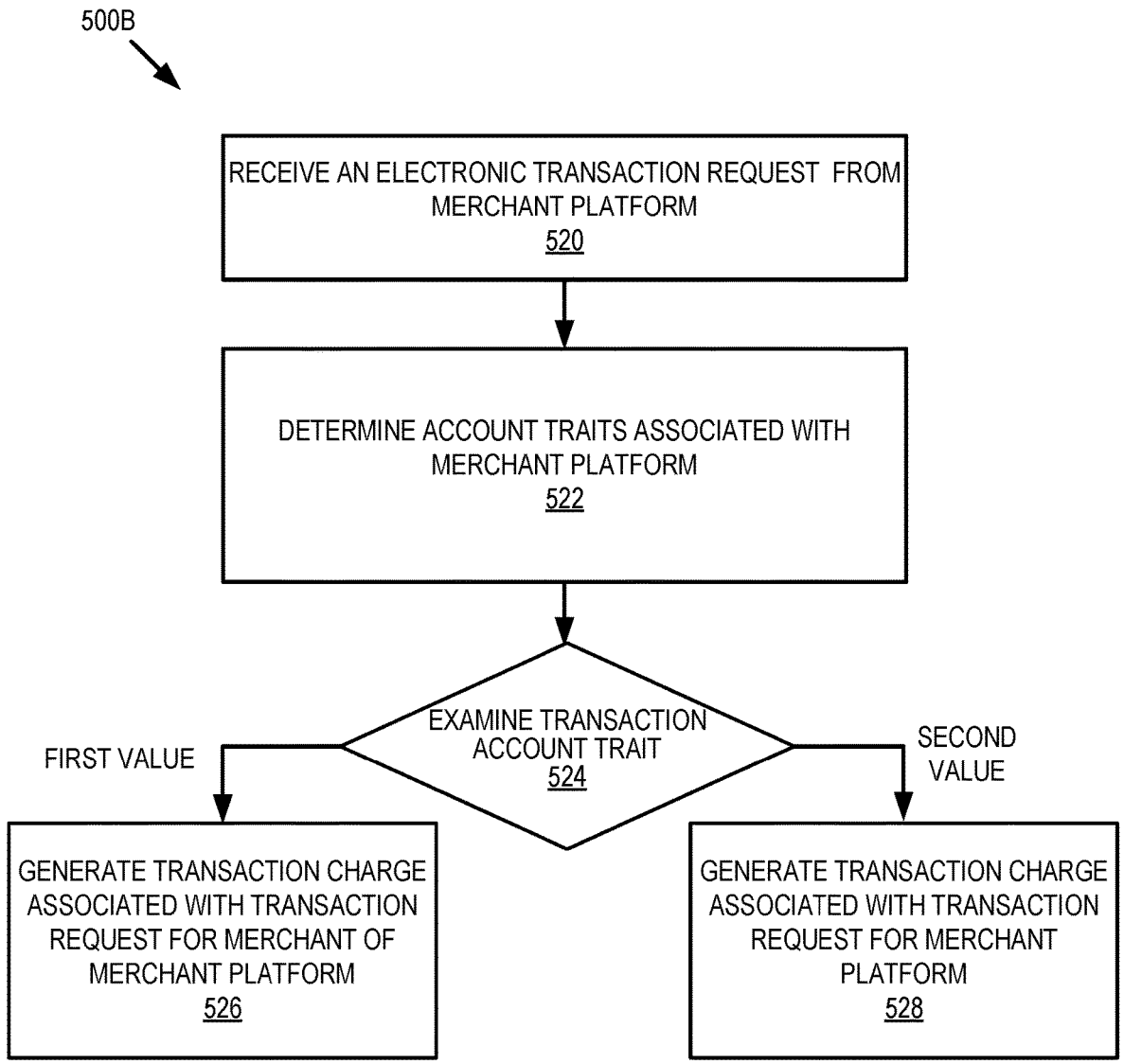
FIG. 5B is a flow diagram of one embodiment of a method for generating a transaction charge based on a value of a transaction trait of a plurality of account trait data, in accordance with some embodiments of the present disclosure.

FIG. 5B is a flow diagram of one embodiment of a method 500B for generating a transaction charge 310 based on a value of a transaction trait 370 of a plurality of account trait data store 170, in accordance with some embodiments of the present disclosure. The method 500B is performed by processing logic that may comprise hardware (circuitry, dedicated logic, etc.), software (such as is run on a general purpose computer system or a dedicated machine), firmware, or a combination. In one embodiment, the method 500B is performed by a commerce platform system 110, as described herein. A description of elements of FIG. 5B that have described previously will be omitted for brevity.

Referring to FIG. 5B, as well as FIGS. 3A and 3B, processing logic begins by receiving an electronic transaction request 160 from a merchant platform system 140 (processing block 520). In some embodiments, the electronic transaction request 160 is associated with a transaction that is a commercial transaction between a consumer and a merchant system 120 associated with the merchant platform system 140.

Processing logic determines account traits associated with the merchant platform system 140 (processing block 522). In some embodiments, account traits associated with the merchant platform system 140 may be a subset of a plurality of account trait data store 170 maintained by the commerce platform system 110.

Processing logic examines a transaction trait 370 of the account traits (processing block 524). In some embodiments, processing logic identifies a value of the transaction trait 370. In some embodiments, the transaction trait 370 may be set to one of a plurality of values.

In response to determining that the transaction trait 370 has a first value, the processing logic may generate a transaction charge 310 associated with the transaction request 160 for the merchant system 120 of the merchant platform system 140 (processing block 526). For example, in some embodiments, the transaction charge 310 may be assessed to the merchant system 120 based on a value of the transaction request 160.

In response to determining that the transaction trait 370 has a second value, the processing logic may generate a transaction charge 310 associated with the transaction request 160 for the merchant platform system 140 (processing block 526). For example, the transaction trait 370 having the second value may indicate the merchant platform system 140 is responsible for the transaction charge 310 associated with the transaction request 160.

Figure 5C:
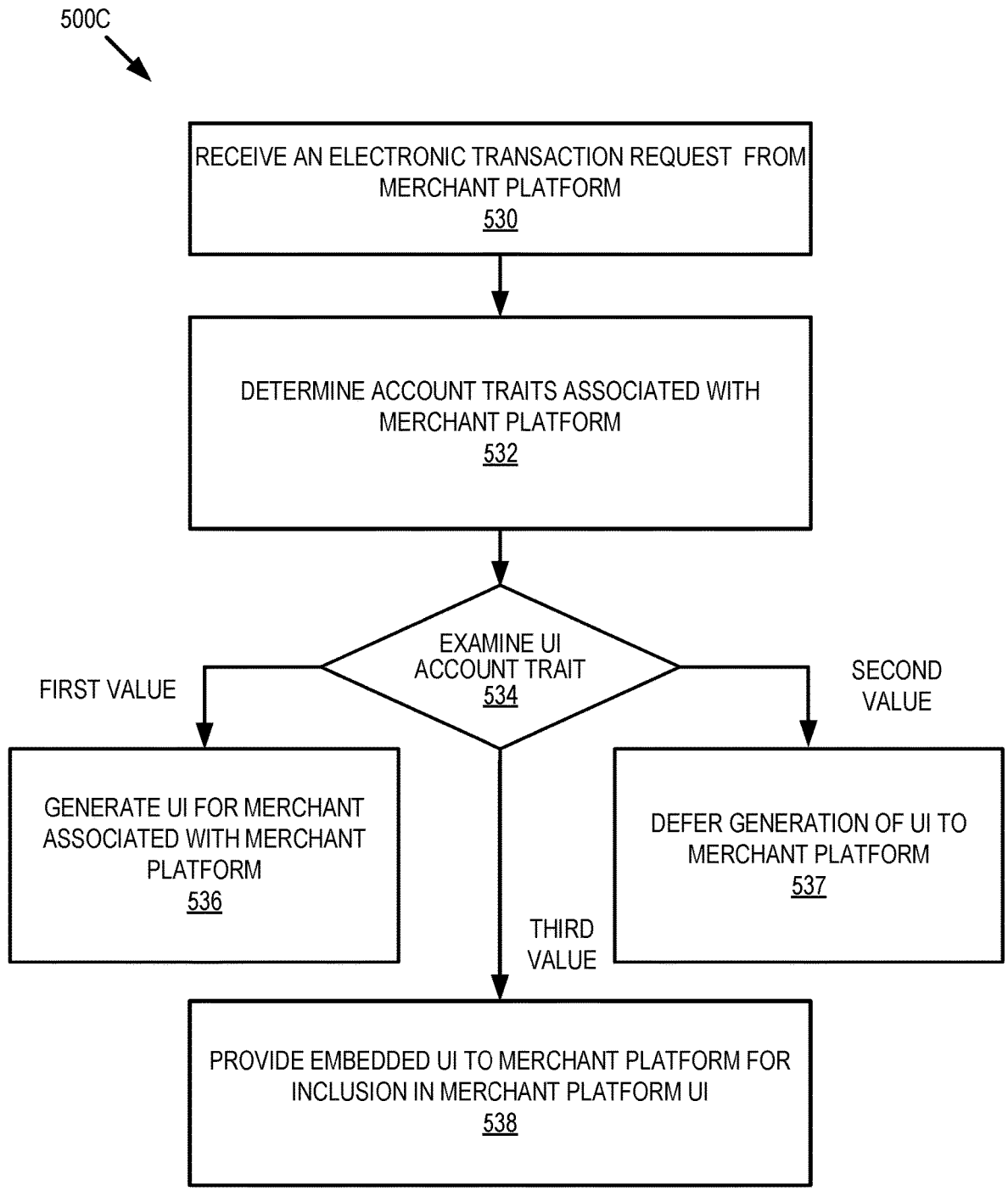
FIG. 5C is a flow diagram of one embodiment of a method for performing a UI generation based on a value of a UI trait of a plurality of account trait data, in accordance with some embodiments of the present disclosure.

FIG. 5C is a flow diagram of one embodiment of a method 500C for performing a UI generation based on a value of a UI trait 470 of a plurality of account trait data store 170, in accordance with some embodiments of the present disclosure. The method 500C is performed by processing logic that may comprise hardware (circuitry, dedicated logic, etc.), software (such as is run on a general purpose computer system or a dedicated machine), firmware, or a combination. In one embodiment, the method 500C is performed by a commerce platform system 110, as described herein. A description of elements of FIG. 5C that have described previously will be omitted for brevity.

Referring to FIG. 5C, as well as FIGS. 4A, 4B, and 4C, processing logic begins by receiving an electronic transaction request 160 from a merchant platform system 140 (processing block 530). In some embodiments, the electronic transaction request 160 is associated with a transaction that is a commercial transaction between a consumer and a merchant system 120 associated with the merchant platform system 140.

Processing logic determines account traits associated with the merchant platform system 140 (processing block 532). In some embodiments, account traits associated with the merchant platform system 140 may be a subset of a plurality of account trait data store 170 maintained by the commerce platform system 110.

Processing logic examines a UI trait 470 of the account traits (processing block 534). In some embodiments, processing logic identifies a value of the UI trait 470. In some embodiments, the UI trait 470 may be set to one of a plurality of values.

In response to determining that the UI trait 470 has a first value, the processing logic may generate a UI for the merchant system 120 associated with the merchant platform system 140 (processing block 536). In some embodiments, the UI may be a UI dashboard 410A. In some embodiments, generating the UI may be performed responsive to a UI request 460 from the merchant system 120 to the commerce platform system 110.

In response to determining that the UI trait 470 has a second value, the processing logic may defer a generation of a UI for the merchant system 120 to the merchant platform system 140 (processing block 517). In some embodiments, the UI generated by the merchant platform system 140 may be a UI dashboard 410B. In some embodiments, generating the UI may be performed responsive to a UI request 460 from the merchant system 120 to the merchant platform system 140.

In response to determining that the UI trait 470 has a third value, the processing logic may generate an embedded UI 490 for inclusion in a UI provided by the merchant platform system 140 to the merchant system 120 (processing block 538). In some embodiments, the UI generated by the merchant platform system 140 may be a UI dashboard 410C including the embedded UI 490 received from the commerce platform system 110. In some embodiments, generating the UI may be performed responsive to a UI request 460 from the merchant system 120 to the merchant platform system 140. In some embodiments, the embedded UI 490 may direct UI data requests 497 to the commerce platform system 110.

Though illustrated separately in the prior figures, it will be understood that the processing of the account traits 170 may be combined in some embodiments of the present disclosure. For example, the commerce platform system may be configured to examine the account traits 170 to determine values of the risk trait 270, the transaction trait 370, and/or the UI trait 470 in any combination and alter its operations accordingly. Thus, the processing of the account traits may be combined in a plurality of ways. As a non-limiting example, in response to a transaction request 160, the commerce platform system 110 may determine that the account traits 170 of the associated merchant platform system 140 indicate that the commerce platform system 110 is to perform the risk calculation for the merchant platform system 140 (e.g., the risk trait 270 has a first value), that transaction fees associated with the merchant platform system 140 are to be charged to the merchant platform 140 (e.g., the transaction trait 370 has a second value), and that the merchant platform system 140 is responsible for generating a UI dashboard for its associated merchant systems 120 (e.g., the UI trait 470 has a second value). The embodiments of the present disclosure are not limited to a particular processing order or combination of the account traits 170, and each of the embodiments described herein may be combined with one another while remaining within the scope of the present disclosure.

Figure 6:
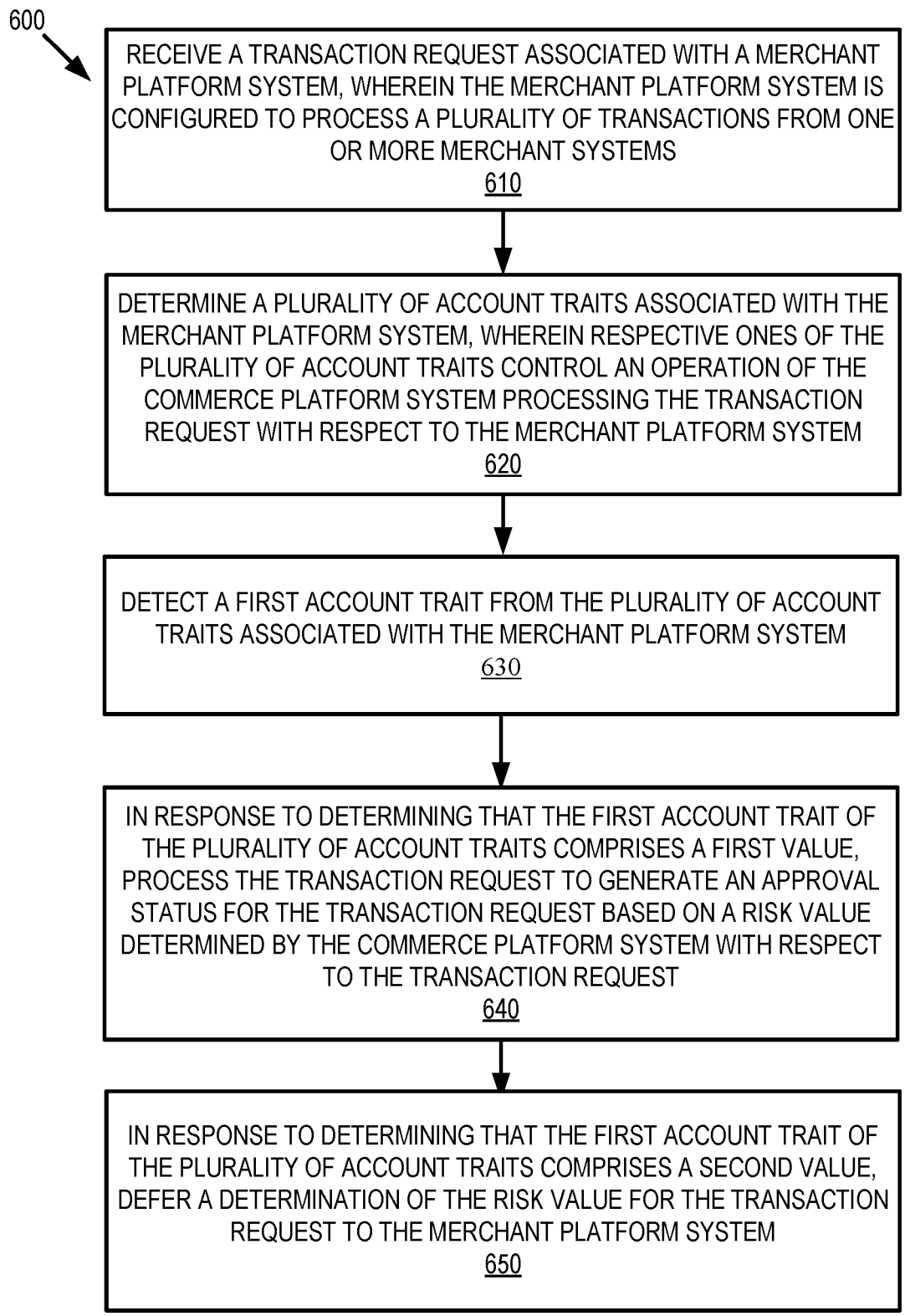
FIG. 6 is a flow diagram of one embodiment of a method for processing a transaction request from a merchant platform system, in accordance with some embodiments of the present disclosure.

FIG. 6 is a flow diagram of one embodiment of a method 600 for processing a transaction request from a merchant platform system, in accordance with some embodiments of the present disclosure. The method 600 is performed by processing logic that may comprise hardware (circuitry, dedicated logic, etc.), software (such as is run on a general purpose computer system or a dedicated machine), firmware, or a combination. In one embodiment, the method 600 is performed by a commerce platform system 110, as described herein. A description of elements of FIG. 6 that have described previously will be omitted for brevity. In some embodiments, the merchant platform system may be similar to the merchant platform system 140 described herein.

Referring to FIG. 6, as well as the prior figures, processing logic begins by receiving a transaction request associated with a merchant platform system (processing block 610). The merchant platform system may be configured to process a plurality of transactions from one or more merchant systems. In some embodiments, the transaction request may be similar to the transaction request 160 described herein. In some embodiments, the plurality of merchant systems may be similar to the merchant systems 120 described herein.

Processing logic determines a plurality of account traits associated with the merchant platform system (processing block 620). Respective ones of the plurality of account traits may control an operation of the commerce platform system processing the transaction request with respect to the merchant platform system.

Processing logic detects a first account trait from the plurality of account traits associated with the merchant platform system (processing block 630).

In response to determining that the first account trait of the plurality of account traits comprises a first value, the processing logic processes the transaction request to generate an approval status for the transaction request based on a risk value determined by the commerce platform system with respect to the transaction request (processing block 640). In some embodiments, the approval status may be similar to the decision 272 described herein with respect to FIG. 2A.

In response to determining that the first account trait of the plurality of account traits comprises a second value, the processing logic defers a determination of the risk value for the transaction request to the merchant platform system (processing block 650).

In some embodiments, the method 600 may further include, in response to the first account trait of the plurality of account traits comprising a third value, the processing logic may further determine the risk value for the transaction request, generate a communication comprising a risk recommendation corresponding to the transaction request based on the risk value, and transmit the risk recommendation to the merchant platform system.

In some embodiments, the method 600 may further include the processing logic modifying the first account trait of the plurality of account traits to transition the determination of the risk value for the transaction request from the commerce platform system to the merchant platform system.

In some embodiments, the method 600 may further include the processing logic detecting a second account trait from the plurality of account traits associated with the merchant platform system, in response to determining that the second account trait of the plurality of account traits comprises a third value, generating a UI for a first merchant system of the one or more merchant systems, in response to determining that the second account trait of the plurality of account traits comprises a fourth value, deferring the generation of the UI to the merchant platform system, and, in response to determining that the second account trait of the plurality of account traits comprises a fifth value, generating an embedded UI for inclusion in a UI generated by the merchant platform system.

In some embodiments, the transaction request may be associated with a first merchant system of the one or more merchant systems, and the method 600 may further include the processing logic detecting a third account trait from the plurality of account traits associated with the merchant platform system, in response to determining that the third account trait of the plurality of account traits comprises a third value, generating a first transaction charge for the first merchant system in response to the transaction request and submitting the first transaction charge to the first merchant system, and, in response to determining that the third account trait of the plurality of account traits comprises a fourth value, generating a second transaction charge for the merchant platform system in response to the transaction request and submitting the second transaction charge to the merchant platform system.

In some embodiments, the transaction request may be associated with a first merchant system of the one or more merchant systems, and the method 600 may further include the processing logic generating a dashboard UI for the first merchant system, wherein a structure of the dashboard UI is based in part on one or more of the plurality of account traits of the merchant platform system. In some embodiments, generating the approval status for the transaction request based on the risk value determined by the commerce platform system with respect to the transaction request includes analyzing one or more characteristics of the transaction request to determine if the risk value exceeds a risk threshold, and, in response to the risk value exceeding the risk threshold, transmitting a communication to the dashboard UI for the first merchant system that indicates a risk action taken with regard to the transaction request.

Figure 7:
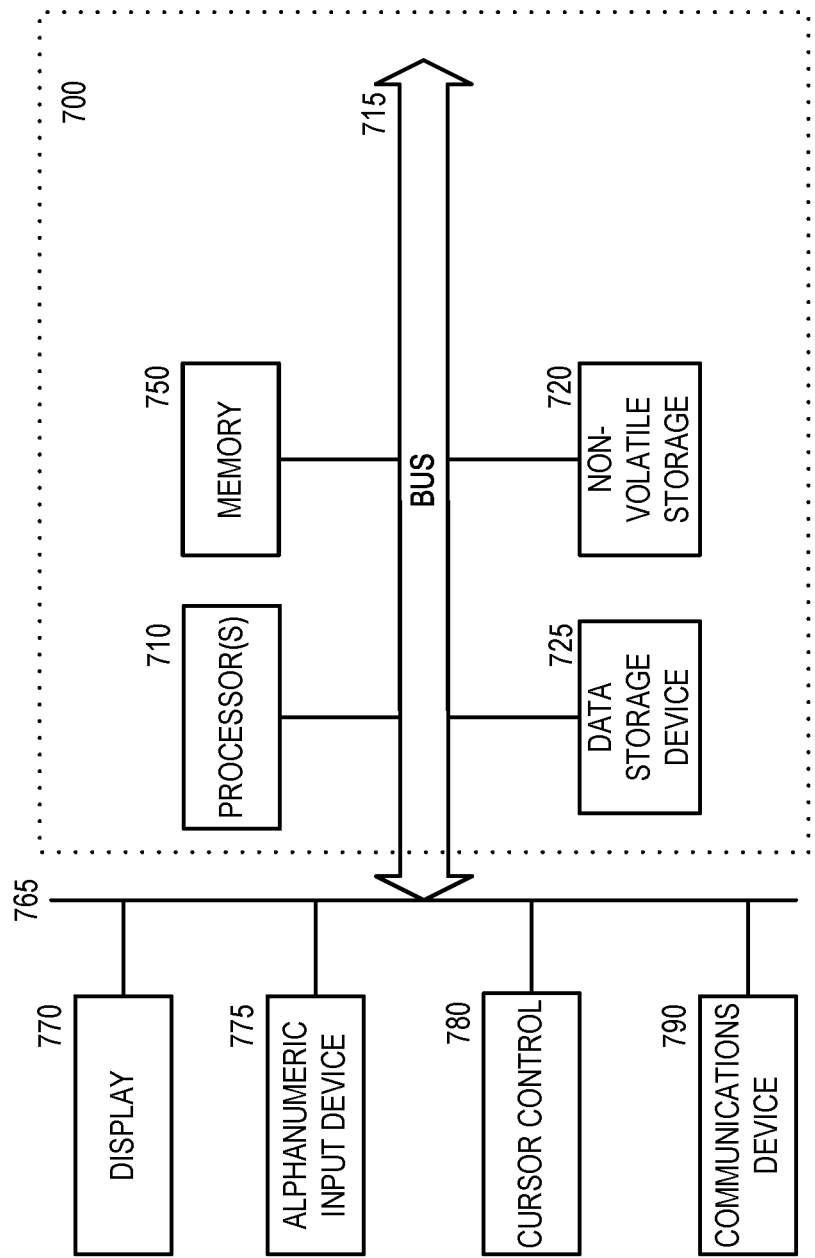
FIG. 7 is one embodiment of a computer system that may be used to support the systems and operations discussed herein.

FIG. 7 is one embodiment of a computer system that may be used to support the systems and operations discussed herein. For example, the computer system illustrated in FIG. 7 may be used by a commerce platform system, a merchant system, user system, etc. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for processing, by a first computer platform system, a request associated with a second computer platform system comprising:
    receiving, at the first computer platform system, the request associated with the second computer platform system, wherein the second computer platform system is configured to process a plurality of requests from one or more systems;
    in response to the request, determining, at the first computer platform system, a plurality of account traits associated with the second computer platform system, wherein respective ones of the plurality of account traits control an operation of the first computer platform system processing the request with respect to the second computer platform system;
    detecting, at the first computer platform system, a risk trait from the plurality of account traits associated with the second computer platform system;
    in response to determining, at the first computer platform system, that the risk trait of the plurality of account traits comprises a first value indicating that the first computer platform system is to determine a risk value for the request, invoking, at the first computer platform system, one or more machine learning models to generate the risk value for the request, determining, at the first computer platform system, whether the risk value exceeds a risk threshold, and in response to determining the risk value exceeding the risk threshold, denying, at the first computer platform system, the request, wherein the one or more machine learning models are at least partially created using features extracted from historical data;
    in response to determining, at the first computer platform system, that the risk trait of the plurality of account traits comprises a second value indicating that the first computer platform system is to defer determining the risk value for the request, deferring, at the first computer platform system, a determination of the risk value for the request to the second computer platform system;
    detecting, at the first computer platform system, a user interface (UI) trait from the plurality of account traits associated with the second computer platform system;
    in response to determining, at the first computer platform system, that the UI trait of the plurality of account traits comprises a first value indicating that the first computer platform system is to generate a first UI dashboard for a first system of the one or more systems, generating, at the first computer platform system, the first UI dashboard for the first system, and transmitting, at the first computer platform system, the first UI dashboard to the first system, wherein the first UI dashboard is displayed on the first system; and
    in response to determining, at the first computer platform system, that the UI trait of the plurality of account traits comprises a second value indicating that the second computer platform system is to provide a second UI dashboard to the first system, transmitting, at the first computer platform system, UI data to the second computer platform system to enable the second computer platform system to generate the second UI dashboard, wherein the second computer platform system generates the second UI dashboard based on the UI data and transmits the second UI dashboard to the first system, and the second UI dashboard is displayed on the first system.

2. The method according to claim 1, further comprising: in response to determining, at the first computer platform system, that the risk trait of the plurality of account traits comprises a third value:
    determining, at the first computer platform system, the risk value for the request;
    generating, at the first computer platform system, a communication comprising a risk recommendation corresponding to the request based on the risk value; and
    transmitting, at the first computer platform system, the risk recommendation to the second computer platform system.

3. The method according to claim 1, further comprising modifying, at the first computer platform system, the risk trait of the plurality of account traits to transition the determination of the risk value for the request from the first computer platform system to the second computer platform system.

4. The method according to claim 1, further comprising:
    in response to determining, at the first computer platform system, that the UI trait of the plurality of account traits comprises a third value indicating that the second computer platform system is to provide a third UI dashboard that includes an embedded UI from the first computer platform system, generating, at the first computer platform system, the embedded UI for inclusion in the third UI dashboard generated by the second computer platform system.

5. The method according to claim 1, wherein the request is associated with the first system of the one or more systems, and
wherein the method further comprises:
detecting, at the first computer platform system, a third account trait from the plurality of account traits associated with the second computer platform system;
in response to determining, at the first computer platform system, that the third account trait of the plurality of account traits comprises a first value, generating, at the first computer platform system, a first charge for the first system in response to the request and submitting the first charge to the first system; and
in response to determining, at the first computer platform system, that the third account trait of the plurality of account traits comprises a second value, generating, at the first computer platform system, a second charge for the second computer platform system in response to the request and submitting the second charge to the second computer platform system.

6. The method according to claim 1, wherein the request is associated with the first system of the one or more systems, and a structure of the first UI dashboard is generated based in part on one or more of the plurality of account traits of the second computer platform system.

7. The method according to claim 6, further comprising:
in response to the risk value exceeding the risk threshold, transmitting, at the first computer platform system, a communication to the first UI dashboard for the first system that indicates the request has been denied.

8. A non-transitory computer readable storage medium including instructions that, when executed by a processor, cause the processor to perform operations for processing a request associated with a second computer platform system, the operations comprising:
receiving, at a first computer platform system, the request associated with the second computer platform system, wherein the second computer platform system is configured to process a plurality of requests from one or more systems;
in response to the request, determining, at a first computer platform system, a plurality of account traits associated with the second computer platform system, wherein respective ones of the plurality of account traits control an operation of the first computer platform system processing the request with respect to the second computer platform system;
detecting, at a first computer platform system, a risk trait from the plurality of account traits associated with the second computer platform system;
in response to determining, at a first computer platform system, that the risk trait of the plurality of account traits comprises a first value indicating that the first computer platform system is to determine a risk value for the request, invoking, at the first computer platform system, one or more machine learning models to generate the risk value for the request, determining, at the first computer platform system, whether the risk value exceeds a risk threshold, and in response to determining the risk value exceeding the risk threshold, denying, at the first computer platform system, the request, wherein the one or more machine learning models are at least partially created using features extracted from historical data;

in response to determining, at the first computer platform system, that the risk trait of the plurality of account traits comprises a second value indicating that the first computer platform system is to defer determining the risk value for the request, deferring, at the first computer platform system, a determination of the risk value for the request to the second computer platform system;
detecting, at the first computer platform system, a user interface (UI) trait from the plurality of account traits associated with the second computer platform system;
in response to determining, at the first computer platform system, that the UI trait of the plurality of account traits comprises a first value indicating that the first computer platform system is to generate a first UI dashboard for a first system of the one or more systems, generating, at the first computer platform system, the first UI dashboard for the first system, and transmitting, at the first computer platform system, the first UI dashboard to the first system, wherein the first UI dashboard is displayed on the first system; and
in response to determining, at the first computer platform system, that the UI trait of the plurality of account traits comprises a second value indicating that the second computer platform system is to provide a second UI dashboard to the first system, transmitting, at the first computer platform system, UI data to the second computer platform system to enable the second computer platform system to generate the second UI dashboard, wherein the second computer platform system generates the second UI dashboard based on the UI data and transmits the second UI dashboard to the first system, and the second UI dashboard is displayed on the first system.

9. The non-transitory computer readable storage medium according to claim 8, wherein the operations further comprise: in response to determining, at the first computer platform system, that the risk trait of the plurality of account traits comprises a third value:
determining, at the first computer platform system, the risk value for the request;
generating, at the first computer platform system, a communication comprising a risk recommendation corresponding to the request based on the risk value; and
transmitting, at the first computer platform system, the risk recommendation to the second computer platform system.

10. The non-transitory computer readable storage medium according to claim 8, wherein the operations further comprise modifying, at the first computer platform system, the risk trait of the plurality of account traits to transition the determination of the risk value for the request from the first computer platform system to the second computer platform system.

11. The non-transitory computer readable storage medium according to claim 8, wherein the operations further comprise:
in response to determining, at the first computer platform system, that the UI trait of the plurality of account traits comprises a fifth third value indicating that the second computer platform system is to provide a third UI dashboard that includes an embedded UI from the first computer platform system, generating, at the first computer platform system, the embedded UI for inclusion in the third UI dashboard generated by the second computer platform system.

12. The non-transitory computer readable storage medium according to claim 8, wherein the request is associated with the first system of the one or more systems, and
wherein the operations further comprise:
  detecting, at the first computer platform system, a third account trait from the plurality of account traits associated with the second computer platform system;
  in response to determining, at the first computer platform system, that the third account trait of the plurality of account traits comprises a first value, generating, at the first computer platform system, a first charge for the first system in response to the request and submitting the first charge to the first system; and
  in response to determining, at the first computer platform system, that the third account trait of the plurality of account traits comprises a second value, generating, at the first computer platform system, a second charge for the second computer platform system in response to the request and submitting the second charge to the second computer platform system.

13. The non-transitory computer readable storage medium according to claim 8, wherein the request is associated with the first system of the one or more systems, and w a structure of the first UI dashboard is generated based in part on one or more of the plurality of account traits of the second computer platform system.

14. The non-transitory computer readable storage medium according to claim 13, wherein the operations further comprise:
  in response to the risk value exceeding the risk threshold, transmitting, at the first computer platform system, a communication to the first UI dashboard for the first system that indicates the request has been denied.

15. A first computer platform system for processing a request associated with a second computer platform system, comprising:
  a memory; and
  a processor coupled with the memory configured to:
    receive the request associated with the second computer platform system, wherein the second computer platform system is configured to process a plurality of requests from one or more systems;
    in response to the request, determine a plurality of account traits associated with the second computer platform system, wherein respective ones of the plurality of account traits control an operation of the first computer platform system processing the request with respect to the second computer platform system;
    detect a risk trait from the plurality of account traits associated with the second computer platform system;
    in response to determining that the risk trait of the plurality of account traits comprises a first value indicating that the first computer platform system is to determine a risk value for the request, invoke one or more machine learning models to generate the risk value for the request, determine whether the risk value exceeds a risk threshold, and in response to determining the risk value exceeding the risk threshold, deny the request, wherein the one or more machine learning models are at least partially created using features extracted from historical data;
    in response to determining that the risk trait of the plurality of account traits comprises a second value indicating that the first computer platform system is to defer determining the risk value for the request, defer a determination of the risk value for the request to the second computer platform system;
    detect a user interface (UI) trait from the plurality of account traits associated with the second computer platform system;
    in response to determining that the UI trait of the plurality of account traits comprises a first value indicating that the first computer platform system is to generate a first UI dashboard for a first system of the one or more systems, generate the first UI dashboard for the first system, and transmit the first UI dashboard to the first system, wherein the first UI dashboard is displayed on the first system; and
    in response to determining that the UI trait of the plurality of account traits comprises a second value indicating that the second computer platform system is to provide a second UI dashboard to the first system, transmit UI data to the second computer platform system to enable the second computer platform system to generate the second UI dashboard, wherein the second computer platform system generates the second UI dashboard based on the UI data and transmits the second UI dashboard to the first system, and the second UI dashboard is displayed on the first system.

16. The first computer platform system according to claim 15, wherein the processor is further configured to: in response to determining that the risk trait of the plurality of account traits comprises a third value:
  determine the risk value for the request;
  generate a communication comprising a risk recommendation corresponding to the request based on the risk value; and
  transmit the risk recommendation to the second computer platform system.

17. The first computer platform system according to claim 15, wherein the processor is further configured to modify the risk trait of the plurality of account traits to transition the determination of the risk value for the request from the first computer platform system to the second computer platform system.

18. The first computer platform system according to claim 15, wherein the processor is further configured to:
  in response to determining that the UI trait of the plurality of account traits comprises a fifth third value indicating that the second computer platform system is to provide a third UI dashboard that includes an embedded UI from the first computer platform system, generate the embedded UI for inclusion in the third UI dashboard generated by the second computer platform system.

19. The first computer platform system according to claim 15, wherein the request is associated with the first system of the one or more systems, and
wherein the processor is further configured to:
  detect a third account trait from the plurality of account traits associated with the second computer platform system;
  in response to determining that the third account trait of the plurality of account traits comprises a first value, generate a first charge for the first system in response to the request and submit the first charge to the first system; and in response to determining that the third account trait of the plurality of account traits comprises a second value, generate a second charge for the second computer platform system in response to the request and submit the second charge to the second computer platform system.

20. The first computer platform system according to claim 15, wherein the request is associated with the first system of the one or more systems, and a structure of the first UI dashboard is generated based in part on one or more of the plurality of account traits of the second computer platform system.

\* \* \* \* \*